(12) United States Patent
Andersen et al.

(45) Date of Patent: Jul. 6, 2021

(10) Patent No.: US 11,051,460 B2

(54) DURABLE FIBER PLANT GROWTH CONTAINERS AND RELATED MATERIALS AND METHODS

(71) Applicant: Jiffy International AS, Kristiansand (NO)

(72) Inventors: Dagfinn Andersen, Lorain, OH (US); John Ward, Lorain, OH (US); Herald Reiersen, Lorain, OH (US)

(73) Assignee: Jiffy International AS, Kristiansand (NO)

(*) Notice: Subject to any disclaimer, the term of this patent is extended or adjusted under 35 U.S.C. 154(b) by 543 days.

(21) Appl. No.: 15/543,456

(22) PCT Filed: Jan. 18, 2016

(86) PCT No.: PCT/US2016/013780
§ 371 (c)(1),
(2) Date: Jul. 13, 2017

(87) PCT Pub. No.: WO2016/118442
PCT Pub. Date: Jul. 28, 2016

(65) Prior Publication Data
US 2018/0000017 A1 Jan. 4, 2018

Related U.S. Application Data

(60) Provisional application No. 62/105,068, filed on Jan. 19, 2015.

(51) Int. Cl.
*A01G 9/02* (2018.01)
*A01G 9/029* (2018.01)

(52) U.S. Cl.
CPC .......... *A01G 9/021* (2013.01); *A01G 9/0291* (2018.02)

(58) Field of Classification Search
CPC ............................ A01G 9/021; A01G 9/029
See application file for complete search history.

(56) References Cited

U.S. PATENT DOCUMENTS

| 3,923,729 A | 12/1975 | Clendinning et al. | |
|---|---|---|---|
| 4,008,543 A * | 2/1977 | Vilt | A01G 9/081 47/1.01 R |

(Continued)

FOREIGN PATENT DOCUMENTS

| CN | 1122182 A | 5/1996 |
|---|---|---|
| CN | 1393122 A | 1/2003 |

(Continued)

OTHER PUBLICATIONS

EP Communication, Application No. 16740549.7, dated Jan. 22, 2019.

(Continued)

*Primary Examiner* — Monica L Barlow
(74) *Attorney, Agent, or Firm* — MacMillan, Sobanski & Todd, LLC

(57) ABSTRACT

Described herein are biodegradable plant pots comprising an additive such as polyvinyl alcohol (PVA), polyvinyl acetate (PVAC), lime, a wax emulsion, or a combination thereof. The additives may be incorporated into the biodegradable plant pots during production, or impregnated into an additive-free biodegradable plant pot. Also described herein are methods and kits for making a biodegradable plant pot.

21 Claims, 26 Drawing Sheets
(20 of 26 Drawing Sheet(s) Filed in Color)

(56) References Cited

U.S. PATENT DOCUMENTS

| | | | |
|---|---|---|---|
| 4,544,693 A | 10/1985 | Surgant | |
| 4,686,790 A * | 8/1987 | Lahalih | A01G 13/0275 47/9 |
| 5,861,360 A | 1/1999 | Rademacher et al. | |
| 6,176,037 B1 | 1/2001 | Muramatsu | |
| 7,213,366 B1 | 5/2007 | Ahm | |
| 7,594,356 B2 | 9/2009 | Freund et al. | |
| 2002/0157309 A1 | 10/2002 | Wibmer | |
| 2003/0074838 A1 * | 4/2003 | Narishima | A01G 9/021 47/77 |
| 2005/0274075 A1 | 12/2005 | Freund et al. | |
| 2006/0086046 A1 | 4/2006 | Aiba | |
| 2006/0107590 A1 | 5/2006 | Kharazipour | |
| 2006/0112629 A1 | 6/2006 | Wright | |
| 2007/0270066 A1 | 11/2007 | Van Herwijnen et al. | |
| 2008/0222952 A1 | 9/2008 | Cheung et al. | |
| 2010/0115836 A1 * | 5/2010 | Julian | A01G 9/021 47/65.7 |
| 2011/0099902 A1 | 5/2011 | Lievestro et al. | |
| 2011/0113687 A1 | 5/2011 | Berk et al. | |
| 2013/0036668 A1 | 2/2013 | Chen et al. | |
| 2013/0318871 A1 * | 12/2013 | Street | A01G 9/02 47/65.7 |
| 2014/0215909 A1 | 8/2014 | Hoff | |
| 2015/0319945 A1 | 11/2015 | Ishizaka | |
| 2016/0219810 A1 | 8/2016 | Erkkilä et al. | |
| 2016/0316640 A1 | 11/2016 | Lepp et al. | |

FOREIGN PATENT DOCUMENTS

| | | | | |
|---|---|---|---|---|
| CN | 1408205 | A | 4/2003 | |
| CN | 1690114 | A | 11/2005 | |
| CN | 101391932 | A | 3/2009 | |
| CN | 101473814 | A | 7/2009 | |
| CN | 101502221 | A | 8/2009 | |
| CN | 102090391 | A | 6/2011 | |
| CN | 102487755 | A | 6/2012 | |
| CN | 102504560 | A | 6/2012 | |
| CN | 102617961 | A | 8/2012 | |
| CN | 102965072 | A | 3/2013 | |
| CN | 103145493 | A | 6/2013 | |
| CN | 103209583 | A | 7/2013 | |
| CN | 103501590 | A | 1/2014 | |
| CN | 103524200 | A | 1/2014 | |
| CN | 103524239 | A | 1/2014 | |
| CN | 103539558 | A | 1/2014 | |
| GB | 1356833 | A | 6/1974 | |
| GB | 2325137 | A | 11/1998 | |
| GB | 2325138 | A | 11/1998 | |
| JO | 1491 | B | 3/1988 | |
| JP | S62295990 | A | 12/1987 | |
| JP | S63301721 | A | 12/1988 | |
| JP | H01199523 | A | 8/1989 | |
| JP | H04169127 | A | 6/1992 | |
| JP | H0517308 | A | 1/1993 | |
| JP | H0576241 | A | 3/1993 | |
| JP | H107213182 | A | 8/1995 | |
| JP | H109149731 | A | 6/1997 | |
| JP | H109294482 | A | 11/1997 | |
| JP | 2742345 | B2 | 4/1998 | |
| JP | H110191803 | A | 7/1998 | |
| JP | H110323121 | A | 12/1998 | |
| JP | H111190028 | A | 7/1999 | |
| JP | 2007039674 | A | 2/2007 | |
| JP | 2010268802 | A | 12/2010 | |
| KR | 20010095606 | A | 11/2001 | |
| KR | 20090129233 | A | 12/2009 | |
| MX | 9700144 | A | 3/1998 | |
| RU | 2499382 | C2 | 11/2013 | |
| TW | 201223440 | A | 6/2012 | |
| WO | 0182680 | A | 11/2001 | |
| WO | WO-03105569 | A1 * | 12/2003 | A01G 9/021 |
| WO | 2008009278 | A2 | 1/2008 | |
| WO | 2011123602 | A | 10/2011 | |
| WO | 2012081980 | A1 | 6/2012 | |
| WO | 2016016407 | A1 | 2/2016 | |

OTHER PUBLICATIONS

Chinese First Office Action, Application No. 201680006287.6, dated Oct. 10, 2019.
European Patent Office. Communication pursuant to Article 94(3) EPC for European application No. 16740549.7, dated May 25, 2020, pp. 1-6.

* cited by examiner

DURABLE FIBER PLANT GROWTH CONTAINERS AND RELATED MATERIALS AND METHODS

CROSS-REFERENCE TO RELATED APPLICATIONS

This application is a national stage application filed under 35 U.S.C. § 371 of international application PCT/US16/13780, filed under the authority of the Patent Cooperation Treaty on Jan. 18, 2016, published; which claims priority to U.S. Provisional Application No. 62/105,068, filed under 35 U.S.C. § 111(b) on Jan. 19, 2015. The aforementioned applications are hereby incorporated by reference in their entirety for all purposes.

BACKGROUND OF THE INVENTION

Biodegradable plant growth containers, or plant pots, are often used in growing seedlings. As the seedling approaches maturity, the entire pot may be transplanted into the ground. This is advantageous, as planting the entire pot along with the growing medium avoids the need to disrupt the seedling's rootball, thereby minimizing or preventing transplant shock. Another advantage of biodegradable pots, such as peat and coir pots, is that roots are able to penetrate through the walls of the pot, which facilitates direct planting of the pot in the field. This is not possible with plastic or high-resin pots without introducing extra holes in the pot wall.

Biodegradable plant pots may also be used in automated seedling production. However, many presently available biodegradable plant pots lack the structural strength required for the automated process, which generally involves lifting and transporting of the pots by robotic arms. Imperfections in the biodegradable plant pots may also create challenges for the automated machinery, making it difficult for the robotic arms to grip and transport the pots. Further, pots involved in automated processes are often subjected to heat and moisture, causing swelling due to moisture absorption and weakening of the pot. Weakened pots may cause problems during the production due to pot breakage, or cause problems further down the distribution chain. For example, seedling-containing biodegradable pots may be further subjected to moisture and heat while stored on greenhouse benches prior to transport to retailers, or subjected to such conditions during transport itself.

Because of the structural shortcomings of many biodegradable plant pots, plastic plant pots are often used. Use of synthetic plastic plant pots is undesirable for direct transplantation into the ground, requiring transplantation of the seedling and thereby causing stress. Often designed for single use, synthetic plastic pots are regularly discarded after use. Plastic plant pots sit in landfills where they take many years to decompose. Bioplastic pots are available, but often take too long to decompose to allow for direct planting in the ground. Bioplastic pots also do not generally allow for root penetration, meaning that the pots would have to degrade in time for a plant's roots to reach into the surrounding soil.

It would be desirable to have a biodegradable plant pot that allows for automated processing, that could withstand storage and transport conditions, and that could be directly transplanted into the ground by the end user.

SUMMARY OF THE INVENTION

Described herein are biodegradable plant growth containers, or plant pots, comprising an additive such as polyvinyl alcohol (PVA), polyvinyl acetate (PVAC), a wax emulsion, or a combination thereof. The additives may be incorporated into the biodegradable plant pots during production, or impregnated into an additive-free biodegradable plant pot. Also described herein are methods and kits for making a biodegradable plant pot.

In a particular embodiment described herein is a biodegradable plant pot comprising an additive such as a wax emulsion, PVAC, PVA, or a combination thereof. The biodegradable plant pot may be made from a biodegradable plant pot material such as peat fiber, coir, wheat straw, paper pulp, Bagasse fibers, wood fiber, flax, kenaf, sisal, digested manure, and combinations thereof. Suitable digested manure includes, but is not limited to, digested manure from bovine, swine, sheep, chicken, turkey, or the like. In particular embodiments, the biodegradable plant pots are made from peat and pulp. In some embodiments, the biodegradable plant pots further include potassium sorbate and/or lime.

The wax emulsions used herein may include any wax emulsion that provides increased break force strength, hydrophobicity, fungal growth resistance, or any combination of these properties. The wax emulsions can be anionic, nonionic, or cationic wax emulsions. In a preferred embodiment, the dispersed phase of the emulsion is paraffin wax. Wax emulsions may have a non-volatile content up to about 45%, though certain suitable cationic emulsions may have a slightly greater non-volatile content. In certain aspects described herein, useful wax emulsions have a non-volatile content of about 25% to about 45%. The pH of a wax emulsion may range from about 8.0 to about 12.5 for an anionic emulsion, or from about 4.0 to about 6.5 for a cationic emulsion. The dispersed phase (solid wax content) of a wax emulsion may be up to about 45%. The wax emulsion may have a viscosity of up to about 450 centipoise (cps). In a particular aspect described herein, the wax emulsion has a viscosity below 200 cps. In particular embodiments, the wax emulsion is either Michem® emulsion 71731MOD or Michem® emulsion 80939M. In other particular embodiments, the wax emulsion is Michem® emulsion 11226, Michem® emulsion 28640, Michem® emulsion 73950, or Michem® emulsion 73550.

Biodegradable plant pots may comprise a wax emulsion at a concentration of up to about 20% dry weight wax/dry weight biodegradable plant pot material. The concentration of wax emulsion in the pot may be adjusted to provide a biodegradable plant pot having a desired characteristic, such as increased tensile strength, hydrophobicity, or fungal growth resistance, or time-dependent degradability.

In certain embodiments, the biodegradable plant pots comprise PVA at a concentration of up to about 10% (w/v) when soaking pots in a laboratory, or up to 10% (w/w; weight PVA per weight dry pot biomaterial) when making pots in a factory. (See the Examples herein for a description of the laboratory method and the factory method.) Similarly to the wax emulsion, the concentration of PVA may be adjusted to provide a biodegradable plant pot having a desired tensile strength or time-dependent degradability. Higher PVA concentrations generally result in higher breakpoint strength and wet-strength, as well as a longer degradation time of the pot.

In certain embodiments, the biodegradable plant pots comprise PVAC at a concentration of up to about 10% (w/v) when soaking pots in laboratory, or up to 10% (w/w; weight PVAC per weight dry pot biomaterial) when making pots in factory. The concentration of PVAC may be adjusted to provide a biodegradable plant pot having a desired tensile strength or time-dependent degradability. Higher PVAC concentrations generally result in drier pots, taking up less water.

In another particular aspect, provided herein are methods for making a biodegradable plant pot comprising providing at least one biodegradable plant pot material selected from the group consisting of peat fiber, coir, wheat straw, paper pulp, Bagasse fibers, wood fiber, flax, kenaf, sisal, digested manure (from bovine, swine, sheep, chicken, turkey, or the like), and combinations thereof; providing one or more additives selected from the group consisting of a wax emulsion, PVA, and PVAC; mixing the at least one biodegradable plant pot material and the one or more additives into an aqueous slurry; and forming a biodegradable plant pot using the aqueous slurry. The biodegradable plant pot may be formed by pumping or vacuum-depositing the aqueous slurry into a mold or form, such as a screen mold. The formed pots may then be dried using vacuum removal of moisture, elevated temperatures, or both.

The biodegradable plant pots made using methods described herein may comprise one or more additives described herein at concentrations sufficient to provide pots having a desired improved tensile strength (wet or dry strength), hydrophobicity, and fungal growth resistance.

In yet another aspect, provided herein are methods for improving an existing biodegradable plant pot comprising providing a biodegradable plant pot, wherein the biodegradable plant pot comprises at least one biodegradable plant pot material selected from the group consisting of peat fiber, coir, wheat straw, paper pulp, Bagasse fibers, wood fiber, flax, kenaf, sisal, digested manure (from bovine, swine, sheep, chicken, turkey, or the like), and combinations thereof; providing an aqueous solution comprising one or more additives selected from the group consisting of a wax emulsion, polyvinyl acetate, polyvinyl alcohol, lime, and combinations thereof; and soaking the biodegradable plant pot in the aqueous solution. Adjusting the pH to about pH 7 or above with lime may also protect against some fungi, such as, but not limited to, peat specific fungi with low pH growth optimum. This method improves the tensile strength (wet or dry strength), hydrophobicity, and fungal growth resistance of the existing biodegradable plant pot.

The concentrations of additive in the aqueous solution may be adjusted to give a biodegradable plant pot having the desired levels of increased tensile strength (by adding wax emulsion, lime, PVAC, and/or PVA), hydrophobicity (by adding wax emulsions and/or PVAC), fungal growth resistance (by also adjusting pH with lime to about pH 7 or above), and time dependent degradation. Altering the concentration of the additive in solution affects the amount of additive impregnating or coating the pot. These may be further varied by altering the soaking time of the existing biodegradable plant pot. Preferably, the improved biodegradable plant pots are dried following the soaking step.

In yet another embodiment, described herein is a kit for improving a biodegradable plant pot, the kit comprising one or more additives selected from the group consisting of a wax emulsion, polyvinyl acetate, polyvinyl alcohol, lime for adjusting pH, and combinations thereof; and instructions for improving a biodegradable plant pot using the one or more additives. The instructions provide steps for carrying out a method for improving an existing biodegradable plant pot, as described herein. Kits may further comprise one or more existing biodegradable plant pots. These pots may be made from peat fiber, coir, wheat straw, paper pulp, Bagasse fibers, wood fiber, flax, kenaf, sisal, digested manure (from bovine, swine, sheep, chicken, turkey, or the like), and combinations thereof. Kits may also further comprise at least one container, such as a bucket, for soaking the one or more biodegradable plant pots in the one or more additives.

BRIEF DESCRIPTION OF THE DRAWINGS

The patent or application file contains one or more drawings executed in color and/or one or more photographs. Copies of this patent or patent application publication with color drawing(s) and/or photograph(s) will be provided by the Patent Office upon request and payment of the necessary fee.

FIG. 1A: Force plot showing load testing results of standard peat pot (gold line; 4), peat pot made with 1% (w/v) PVA (green line; 3), peat pot treated with 2% (w/v) PVA (red line; 2) and peat pot having added 5% (w/v) PVA solution (black line; 1) after 10 minutes soaking in water.

FIG. 1B: Force plot showing load testing results of the same pot compositions as described in FIG. 1A, but after 1 hour in water.

FIGS. 1C-1D: Force plots showing load testing results of the same pot compositions as described in FIG. 1A after 24 hours and 7 days in water, respectively.

FIG. 7A: A 1% (w/v) PVA treated pot is on the far left and a standard peat pot is on the far right. The pot in the middle was treated with 1% (w/v) PVA and 3% (v/v) 71731. Peat pots were filled with container mix (Jiffy Mix #1), and planted with Zinnia—an ornamental flowering annual.

FIG. 7B: The peat pot to the left was treated with 3% (v/v) 71731 wax emulsion, and compared to the same standard peat pot (right) as pictured in FIG. 7A. Plants were grown for approximately 5 weeks in outdoor summer weather conditions of temperatures ranging between 23-29° C. with regular overhead watering.

FIG. 9A: Line graph showing test results for tensile breaking points of peat pots made with different wax emulsions.

FIG. 9B: Line graph showing test results for water absorption of peat pots made with different wax emulsions.

FIG. 10A: From left to right: the pot made with 71731 wax emulsion (0.5%, v/v), the pot made with 80939 wax emulsion pot (0.5%, v/v), and the standard peat pot.

FIG. 10B: Standard peat pot is on the left and the pot made with 0.5% (v/v) 71731 emulsion is on the right.

FIG. 11A: Line graph showing test results for tensile breaking points of peat pots made with different wax emulsions.

FIG. 11B: Line graph showing test results for water absorption of peat pots made with different wax emulsions.

FIG. 12A: Force plot showing load test results for standard peat pot with no treatment (teal line; 7), peat pot made with 1% (w/v) PVA (purple line; 6), peat pot made with 2% (w/v) PVA (blue line; 5), peat pot made with 0.25% (v/v) 71731 wax emulsion (gold line; 4), peat pot made with 0.5% (v/v) 71731 wax emulsion (green line; 3), peat pot made with 0.25% (v/v) 71731 and 2% (w/v) PVA (red line; 2), peat pot made with 0.5% (v/v) 71731 and 2% (w/v) PVA (black line; 1).

FIG. 12B: Force plot showing load test results for coir pot made with 0.25% (v/v) 71731 wax emulsion (purple line; 6), pot made with 0.5% (v/v) 71731 wax emulsion (blue line; 5), pot made with 1% (w/v) PVA (gold line; 4), pot made with 2% (w/v) PVA (green line; 3), pot made with 0.25% (v/v) 71731 and 2% (w/v) PVA (red line; 2), and pot made with 0.5% (v/v) 71731 and 2% (w/v) PVA (black line; 1).

FIG. 17A: left pot 2% (w/w) potassium sorbate; right pot 2% (w/w) PVA (as in FIG. 16). FIGS. 17B-17C show that for pots with potassium sorbate (FIG. 17B) there was root penetration, but for PVA (FIG. 17C), the roots stayed inside the pot.

FIG. 20A: Left: R2C=standard 71731 wax emulsion pot with added 0.5% (w/w) PVAC (VA710; Intercol). Middle: R2A=standard 71731 wax emulsion pot with added 1% (w/w) PVA (pooled VA101/VA102; Intercol). Right: WP2C=71731 wax emulsion with CTMP only (no peat) and with added 0.5% (w/w) PVAC (VA710; Intercol). FIG. 20B: Two pots made with 71731 wax emulsion with slurry pH adjusted to pH 7. Some white spots of undissolved lime are visible on the left pot. Inside the pots were Jiffy substrate mix and water. The bottom parts of the pots were kept constantly under water (1-2 cm from bottom) for 1 week (FIG. 20A) and 4 weeks (FIG. 20B).

FIG. 21A: Photograph of pots after being subjected to puncture test. FIG. 21B: Tensile measurement/load testing results. WP2C pot—black line (labeled 1; 58.1N). R2C pot—red line (labeled 2; 35.4N). R2A pot—green line (labeled 3; 34.2N). R2 pot—gold line (labeled 4; 24.0N). Standard pot—dark blue line (labeled 5; 11.9N). Pot details are in FIG. 19.

FIG. 22A: Tensile strength over time. Tensile breaking points of peat pots made with different additives to 71731 wax emulsion were tested. FIG. 22B: Water absorption over time. Pots were weighed after the noted incubation times in water. Pot details are in FIG. 19.

DETAILED DESCRIPTION OF THE PREFERRED EMBODIMENT(S)

Figure 1A:
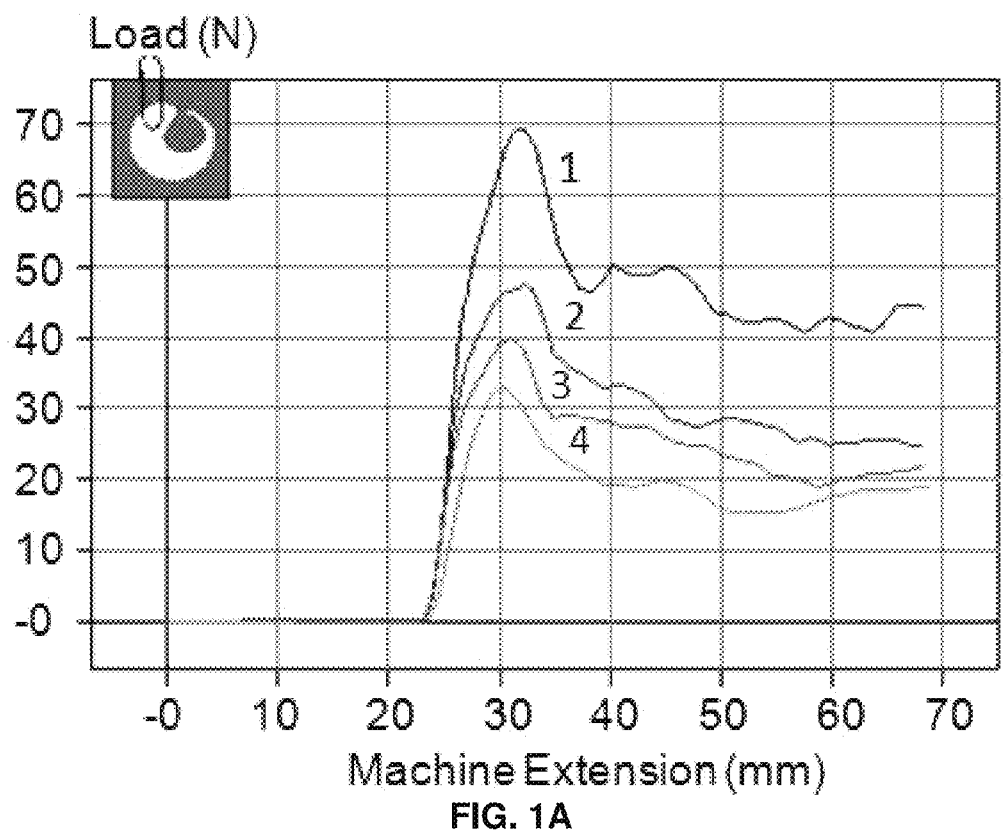
FIGS. 1A-1D: Load testing of laboratory made PVA pots in a texture analyzer after soaking pots in water.
Figure 1B:
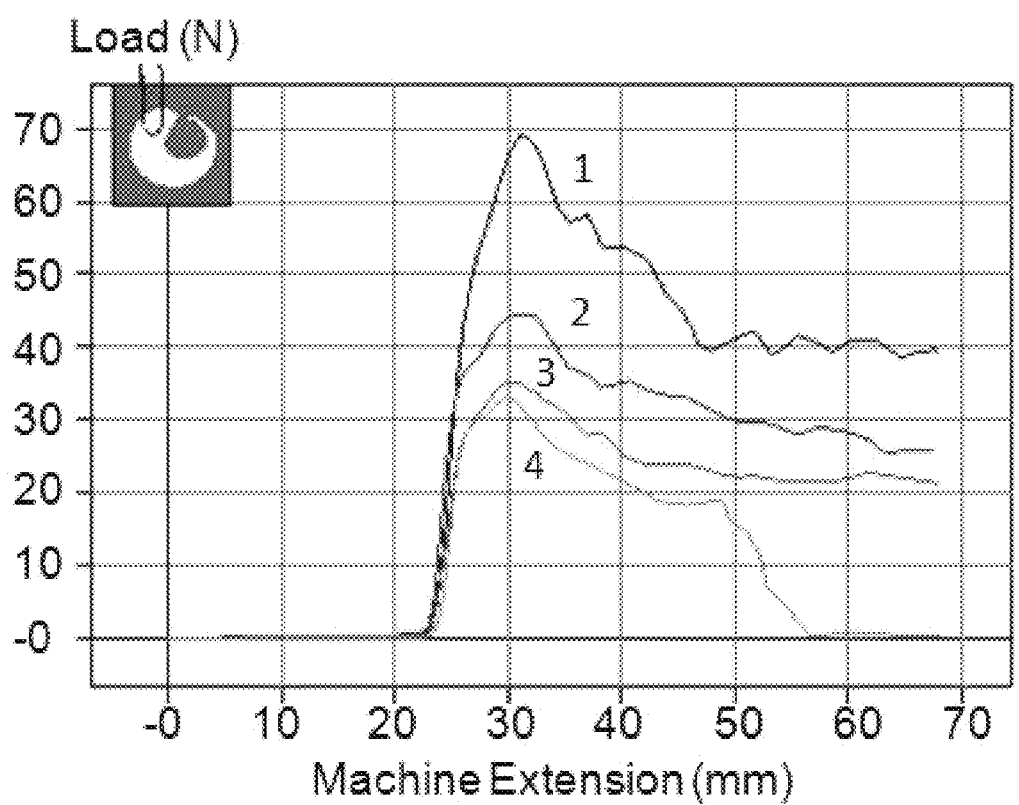
Figure 1C:
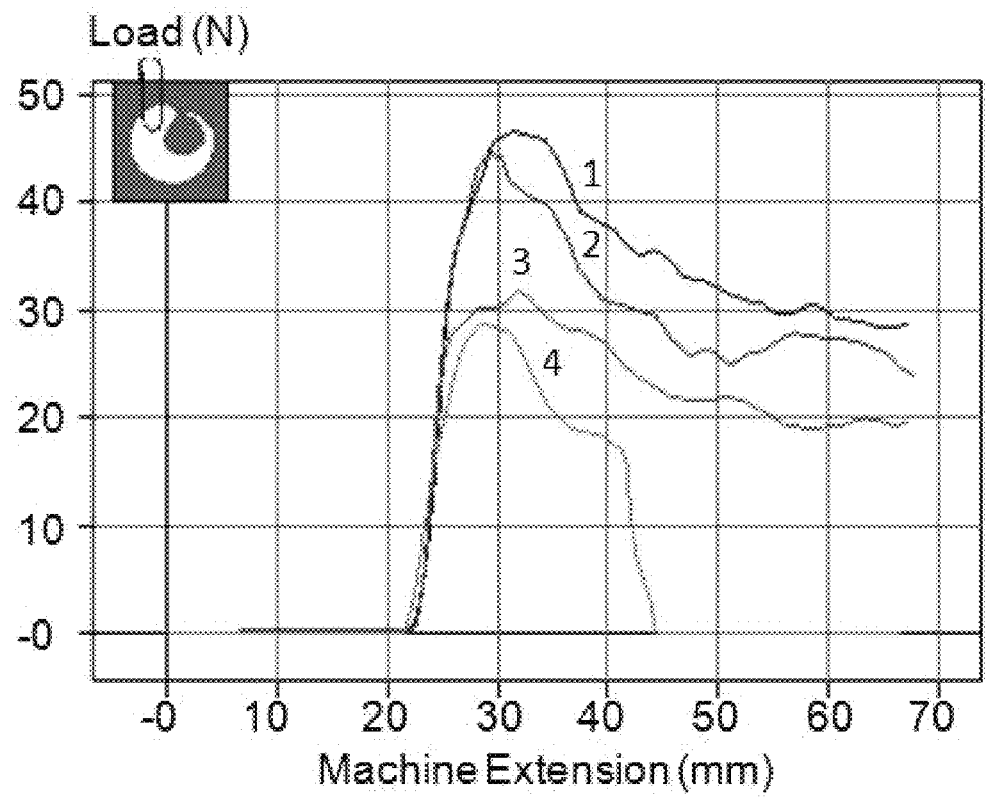

Described herein are biodegradable plant growth containers, or plant pots, comprising an additive such as polyvinyl alcohol (PVA), polyvinyl acetate (PVAC), a wax emulsion, lime to adjust pH, or a combination thereof. The additives may be incorporated into the biodegradable plant pots during production, or impregnated into an additive-free biodegradable plant pot. Also described herein are methods and kits for making a biodegradable plant pot.

It should be understood that multiple non-limiting methods are described for making the biodegradable plant pots of the present disclosure, namely, (i) a "laboratory" or soaking method, and (ii) a "factory" or slurry method. These terms are not intended to be limiting in any way, but, rather, are used for clarification and convenience only. In other words, biodegradable plant pots of the present disclosure made by the "factory" method need not be made in a literal factory, and biodegradable plant pots of the present disclosure made by the "laboratory" method need not be made in a literal laboratory. Furthermore, it is understood that other methods of producing the biodegradable plant pots are possible and entirely within the scope of the present disclosure. The additives are generally described as being incorporated in amounts that are expressed in different concentration units based on the method of production. For instance, biodegradable plant pots made through the "laboratory" method include additives at concentrations given in weight per volume, or "w/v", whereas biodegradable plant pots made through the "factory" method include additives at concentrations given in weight per weight, or "w/w".

In certain embodiments described herein, a biodegradable plant pot comprises one or more additives, which may include, but are not limited to, PVA, PVAC, wax emulsions, and lime.

As used herein, "polyvinyl alcohol" and "PVA" refer to a water-soluble synthetic polymer having the general formula $[CH_2CH(OH)]_n$. PVA may be supplied as a solid or as an aqueous solution. In particular embodiments, PVA is provided as a superfine grade solid having 99% purity. PVA can be manufactured from hydrolysis of polyvinyl acetate. PVA can be fully hydrolyzed (all —OH groups), but may also be only partly hydrolyzed (e.g., 85-90% —OH groups) with, for example, 10-15% acetate groups. Suitable examples of commercially available PVA include, but are not limited to: Selvol 165SF (Sekisui), which has a viscosity of 62-72 cps (high molecular weight); Selvol E575 (Sekisui), which has a molecular weight between 180,000-215,000; Selvol 350 (Sekisui), which has a viscosity of 62-72 cps and a molecular weight between 172,000-186,000; VA101 (Intercol); and VA102 (Intercol).

"Polyvinyl acetate" and "PVAC" refer to an aliphatic polymer having the general formula $[C_4H_6O_2]_n$. PVAC generally has a white color, is insoluble in water, and is sold as an emulsion. Suitable examples of commercially available PVAC include, but are not limited to: VA710 emulsion, which is 50% solids per liter; Aquence LA 0276 emulsions (Henkel); DARATAK® 56L (Owensboro Specialty Polymers, Inc.), which is a very high molecular weight PVAC polymer with a low emulsion viscosity and good tensile strength; and Duracet 300 (Franklin Adhesives & Polymers), which is a PVAC with high molecular weight.

As used herein, "emulsion" refers to a heterogeneous system comprising two immiscible phases in which one (the dispersed phase) is intimately distributed in the other (the continuous phase) as minute droplets. A "wax emulsion" refers to an emulsion wherein the dispersed phase is a wax. Any suitable liquid may be used as the continuous phase for a particular wax. Generally, the continuous phase is water or another solvent.

Wax emulsions useful herein may be any wax emulsion that provides increased tensile strength, hydrophobicity, or any combination of these properties. In a preferred embodiment, the dispersed phase of the emulsion is paraffin wax. Wax emulsions may have a non-volatile content up to about 45%. In certain aspects described herein, useful wax emulsions have a non-volatile content of about 25% to about 45%. The pH of an anionic wax emulsion may range from about 8.0 to about 12.5, and a cationic wax emulsion from pH 4-6. The dispersed phase (solid wax content) of a wax emulsion may be up to about 45%. The wax emulsion may have a viscosity of up to about 450 centipoise (cps). In a particular aspect described herein, the wax emulsion has a viscosity below 200 cps.

In certain non-limiting examples, the wax emulsion is Michem® emulsion 71731MOD (Michelman, Cincinnati, Ohio). The 71731MOD wax emulsion is an anionic paraffin emulsion with a non-volatile content (%) of 30.0-32.0, pH 8.5-9.5, and a Brookfield viscosity below 200 cps. The 71731MOD wax emulsion typically contains about 30-32% solid matter per volume.

In other non-limiting examples, the wax emulsion is Michem® emulsion 80939M (Michelman, Cincinnati, Ohio). The 80939M wax emulsion is a nonionic paraffin wax emulsion with a non-volatile content (%) of 38.5-39.5, pH 10.3-12.3, and a Brookfield viscosity (cps) of 450 max. The 80939M emulsion typically contains about 38-39% solid matter per volume.

In other non-limiting examples, the wax emulsion is Michem® emulsion 11226 (Michelman, Cincinnati, Ohio). The 11226 wax emulsion is a cationic/nonionic polypropylene emulsion with a non-volatile content (%) of 25.2-26.2, pH 4.8-5.8, and a Brookfield viscosity (cps) of <50. The 11226 emulsion has maleated polypropylene solids and the appearance of a white, translucent liquid.

In other non-limiting examples, the wax emulsion is Michem® emulsion 73950 or Michem® emulsion 73550 (Michelman, Cincinnati, Ohio). The 73950 and 73550 emulsions are cationic paraffin wax emulsions with similar non-volatile contents (%) of 49.5-50.5, pH 4.5-6.5, and a Brookfield viscosity (cps) of <500. Both the 73950 emulsion and the 73350 emulsion have scale wax solids and the appearance of a white liquid.

In other non-limiting examples, the wax emulsion is Michem® emulsion 28640 (Michelman, Cincinnati, Ohio). The 28640 emulsion is a cationic/nonionic polypropylene emulsion with a non-volatile content (%) of 39.0-41.0, pH 4.0-6.0, and a Brookfield viscosity (cps) of <1000. The 28640 emulsion has maleated polypropylene solids and the appearance of a liquid.

Many other wax emulsions and wax dispersions are useful in producing a biodegradable plant pot in accordance with the present disclosure.

The biodegradable plant pot comprising the one or more additives may be made up of any organic fibrous material. The organic fibrous material, or biodegradable plant pot material, may be, for example, peat fiber, coir, wheat straw, paper pulp, Bagasse fibers, wood fiber, flax, kenaf, sisal, digested manure (from bovine, swine, sheep, chicken, turkey, or the like), or combinations thereof. This list is not meant to be limiting, as many other organic fibrous materials may also be used. In certain embodiments, the paper pulp is chemi-thermomechanical pulp. In a preferred embodiment, the biodegradable plant pot comprises peat fibers. In another preferred embodiment, the biodegradable plant pot comprises peat fibers and pulp, such as chemi-thermomechanical pulp. The biodegradable plant pot may also comprise other organic materials, such as digested manure.

The biodegradable plant pot preferably comprises the one or more additives at a concentration capable of increasing the break point strength (for wet or dry pot), hydrophobicity, fungal growth resistance, time dependent degradation, or any combination of these properties of the biodegradable plant pot relative to a standard biodegradable plant pot. A standard biodegradable plant pot is a pot having the same general composition as the pot to which it is compared, but lacks the one or more additives.

The wax content of biodegradable plant pots described herein may be selected depending on the desired characteristics of the pot. For example, higher wax content will generally result in a pot having higher tensile strength (see the examples herein), and may affect decomposition rates and the hydrophobicity of the pot. Wax content may also affect the ability of roots to penetrate the pot walls, with higher wax concentrations potentially adversely affecting root penetration, as long as the pot stays water resistant. Wax content may therefore be selected to provide a biodegradable plant pot having a desired tensile strength, decomposition rate, hydrophobicity, and root penetrating characteristics.

Biodegradable plant pots described herein may comprises a wax emulsion. The pots are made with a wax emulsion having a concentration of up to about 20% dry weight wax/dry weight of biodegradable plant pot material. In particular embodiments, a biodegradable plant pot is made with a wax emulsion at a concentration of from about 2% to about 15% dry weight wax/dry weight of biodegradable plant pot material. In a preferred embodiment, a biodegradable plant pot is made with a wax emulsion at a concentration of about 10.7% dry weight wax/dry weight of biodegradable plant pot material. The final concentration of the wax emulsion in the biodegradable plant pots will depend on several factors, such as the absorption rate of the wax emulsion and the hydrophobic interactions between the wax emulsion and the fibers in the pots.

Similarly to the wax content of biodegradable plant pots, lime content to adjust pH, PVA content, and PVAC content may be selected depending on the desired characteristics of the pot. For example, higher PVA content or PVAC contact will generally result in a pot having higher tensile strength of the wet pot (see the examples herein), and better water resistance, and may affect the decomposition rates of the pot. Further, PVA is known to stimulate root, and may therefore positively affect the ability of roots to penetrate the walls of biodegradable plant pots comprising PVA. PVAC is hydrophobic and tends to make biodegradable plant pots drier. PVA content and PVAC may therefore be selected to provide a biodegradable plant pot having a desired tensile strength, decomposition rate, water uptake, and root penetrating characteristics. Adjusting the pH of peat to a pH>7 may partially protect against peat mold, which again increases decomposition time since mold/fungi is also responsible for degrading the pot.

Biodegradable plant pots described herein may be made with PVA having a concentration (weight PVA solute per volume water solvent when pots have been soaked in PVA solution in the laboratory, or weight PVA per weigh dry biodegradable plant pot material when pots are manufactured in factory) of up to about 10% PVA. In a particular embodiment, a biodegradable plant pot is made with PVA having a concentration of from about 0.01% (w/w) to about 10.0% (w/w) PVA/biodegradable plant pot material. In preferred embodiments, a biodegradable plant pot can be made with PVA w/w having a concentration of from about 0.1% to about 5.0% PVA per weight biodegradable plant pot material. The final concentration of the PVA in the biodegradable plant pots will depend on several factors, such as the absorption rate of the PVA and the interactions between the PVA and the fibers in the pots.

Biodegradable plant pots described herein may be made with PVAC having a concentration of up to about 10%) PVAC (weight dry matter PVAC in emulsion per volume water solvent when pots have been soaked in PVAC emulsion in laboratory, or weight PVAC in emulsion per weigh dry biodegradable plant pot material when pots are manufactured in factory). In a particular embodiment, a biodegradable plant pot is made with PVAC having a concentration of from about 0.01% (w/w) to about 10.0% (w/w) PVAC/biodegradable plant pot material. In preferred embodiments, a biodegradable plant pot can be made with PVAC having a w/w concentration of from about 0.1% to about 5.0% PVAC per biodegradable plant pot material. The final concentration of the PVAC in the biodegradable plant pots will depend on several factors, such as the absorption rate of the PVAC and the interactions between the PVAC and the fibers in the pot.

Figure 15:
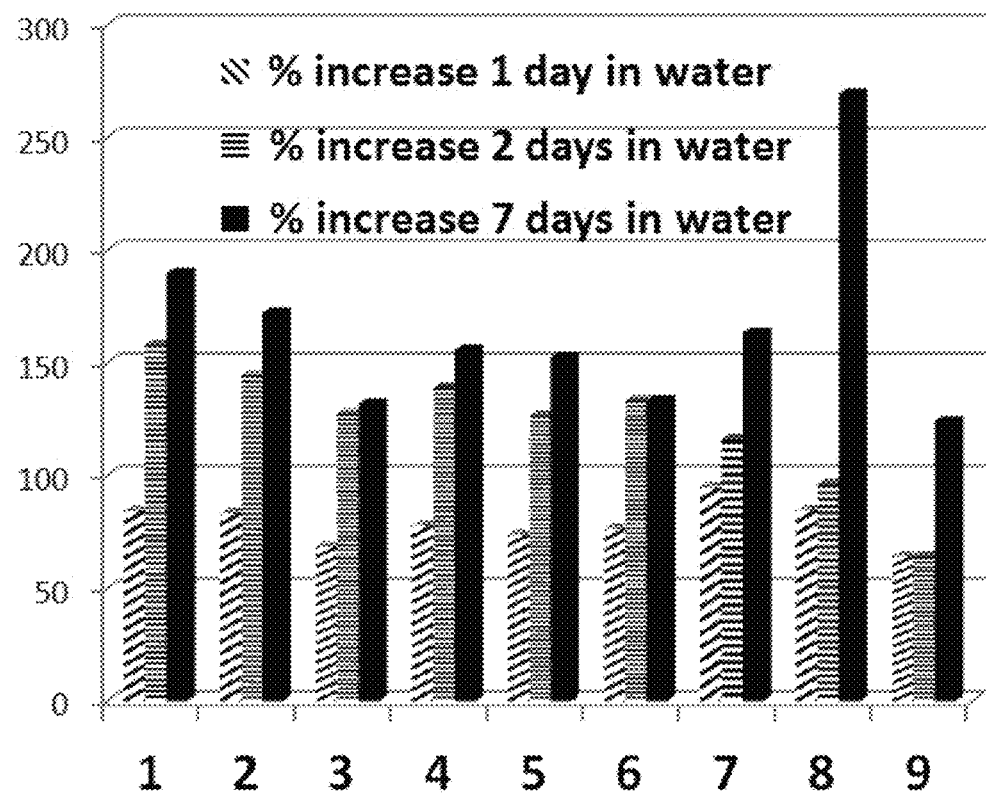
FIG. 15: Water absorption of emulsion wax peat plates up to 7 days in water. The figure displays the water absorption (% increase of wet weight), after 1, 2, and 7 days in water, of the following test peat plates: 1. Standard manufacturing recipe with no lime and WE 73550. 2. Plate with 0.8% (w/w) lime and 73550. 3. Plate with 0.8% (w/w) lime, 73550, and 2% (w/w) potassium sorbate. 4. Plate with 2× lime (1.6%; w/w) and WE 71731. 5. Plate with no lime and 71731. 6. Plate with 0.8% (w/w) lime and 71731. 7. Plate with 0.8% (w/w) lime, 71731, and 2% (w/w) potassium sorbate. 8. Plate with 1.1% (w/w) PVAC; (Aquence LA 0276 from Henkel). 9. Plate with PVAC (1.1% (w/w); LA 0276), and WE 71731. When wax emulsion was added, 19% (w/w) 73550 or 12% (w/w) 71731 was included, and the percentage was based on the weight of peat and pulp.

Biodegradable plant pots can be made with a combination of a wax emulsion and one or both of PVA and PVAC, and also adjusting the pH to about 7 (or above) for peat based pots. Biodegradable peat plant pots treated with only wax emulsions tend to have slightly higher tensile strength than those made with only PVA or PVAC, while the effect is opposite for biodegradable coir pots (see the examples herein and FIG. 12). However, the wax emulsions and PVA have an additive effect on biodegradable pot tensile strength (FIG. 12). Pots made with both a wax emulsion and PVA may therefore allow for even finer control of desired characteristics, and may allow lower concentrations of the additives to be used to achieve a desired characteristic such as high tensile strength. For example, if a biodegradable plant pot is desired to have high tensile strength, but have moderate hydrophobicity and still allow for root penetration, a low wax emulsion content may be chosen (e.g., 0.25%, v/v), along with a moderate PVA concentration (e.g. 2%). PVA inclusion along with a wax emulsion results in moderate hydrophobicity (FIGS. 4, 7, and 13), while PVA stimulates root growth. The increased amount of added wax emulsion ensures a higher degree of hydrophobicity, and results in improved tensile strength for the dry pot (see, e.g., FIG. 12). Pots made with both PVAC and a wax emulsion tend to be drier pots, as this combination is hydrophobic. (FIG. 15.) Pots made with PVAC take up less water than pots made without PVAC.

In certain embodiments, a biodegradable plant pot is made with about 5% dry weight wax/dry weight of biodegradable plant pot material and 2% (w/w) PVA/biodegradable plant pot material. In certain embodiments, a biodegradable plant pot is made with about 5% dry weight wax/dry weight of biodegradable plant pot material and 2% (w/w) PVAC/biodegradable plant pot material. In other embodiments, a biodegradable plant pot is made with about 11% dry weight wax/dry weight of biodegradable plant pot material and 2% (w/w) PVA/biodegradable plant pot material. In other embodiments, a biodegradable plant pot is made with about 11% dry weight wax/dry weight of biodegradable plant pot material and 2% (w/w) PVAC/biodegradable plant pot material.

It will be recognized that the additive concentrations in solution when making a biodegradable plant pot may be varied in order to achieve a pot having particular desired characteristics. The concentrations of additives in solution can affect the absorption rate of the additives by the pots, and the amount of additives absorbed by the pots.

Also described herein are methods for making a biodegradable plant pot. One method comprises providing at least one biodegradable plant pot material, providing one or more additives, mixing the at least one biodegradable plant pot material and the one or more additives into an aqueous slurry, and forming a biodegradable plant pot with the aqueous slurry. This method is sometimes referred to herein as the factory method.

The biodegradable plant pot material may be any of those described above. In a particular embodiment, the biodegradable plant pot material comprised 15 kg dry chemi-thermo-mechanical pulp (CTMP) and 14.7 kg dry peat in 2000 liters of water. This results in a slurry having a mix concentration of biodegradable plant pot material of about 15 g/L. However, various mix concentrations of biodegradable plant pot materials may be used in the methods described herein. For example, the amount of biodegradable plant pot materials of from about 10 g/L to about 20 g/L may be used.

In another embodiment, the biodegradable plant pot material comprises peat and chemi-thermomechanical pulp in a ratio of about 55:45. Increasing the portion of CTMP often increases the strength of the biodegradable pots. Weaker fibers need larger portions of CTMP. It will be recognized that any of the biodegradable plant pot materials described herein, and their equivalents, may be used in the methods described herein.

The methods described herein are scalable, and may be carried out at any desired scale. For example, as described in the examples herein, an aqueous slurry of about 2000 liters may be generated. The scale of the method may be adjusted depending on the size and number of pots to be produced.

The one or more additives may be a wax emulsion, PVA, PVAC, lime to adjust pH, or combinations thereof, as described above. The concentrations of the one or more additives may be varied in order to achieve a biodegradable plant pot having particular desired characteristics, as described above. For example, a wax emulsion may be present in the final aqueous slurry at a concentration of up to about 20% dry weight wax in solution per dry weight biodegradable plant pot material. In a system where the volume of aqueous solution used is 2000L and an amount of biodegradable plant pot material of about 15 g/L, this means approximately 20 liters of wax emulsion are to be used, wherein the wax emulsion has a dry wax content of about 31%. This is equivalent to a wax emulsion concentration of about 1.0% (v/v). In particular embodiments, the wax emulsion is present in the aqueous slurry at a concentration of about 0.1% (v/v) to about 1.0% (v/v). In certain preferred embodiments, the wax emulsion is present in the aqueous slurry at a concentration of about 0.25% (v/v) to about 0.5% (v/v).

In certain embodiments, one or both of PVA or PVAC is present in the aqueous slurry at a concentration (w/w) of up to about 10%. In other embodiments, PVA or PVAC is present in the aqueous slurry at a concentration (w/w) of from about 0.01% to about 5%. In certain preferred embodiments, PVA or PVAC is present in the aqueous slurry at a concentration of about 1% (w/w) to about 2% (w/w).

The one or more additives may be incorporated into the aqueous slurry in any order. For example, the one or more additive may be added to biodegradable plant pot material mixed into water, or vice versa, may be suspended in aqueous solution prior to the addition of the biodegradable plant pot material. In one embodiment, 100% of the one or more additives is added to 100% of the biodegradable plant pot material mixed in 50% of the total volume of mixture to be used. These components are then mixed prior to the addition of the remaining 50% of the aqueous solution. This embodiment allows for the one or more additives to be absorbed by biodegradable plant pot material before the remainder of the aqueous solution is added. In another embodiment, 100% of the one or more additives is added to 100% of the biodegradable plant pot material mixed in 100% of the total volume of aqueous solution to be used.

The resulting aqueous slurry may be formed into biodegradable plant pots. For example, the aqueous slurry may be pumped or vacuum-deposited into one or more screen molds in the desired form of a pot. In particular embodiments, a method for forming biodegradable plant pots similar to that described in U.S. Pat. No. 2,922,476, which is hereby incorporated by reference in its entirety, is used.

Biodegradable plant pots produced by the methods described herein may be of any size or shape. For example, pots may be round, oval, square, rectangular, hexagonal, triangular, or octagonal, and may be of any desired size.

A method for making a biodegradable plant pot plant described herein may further comprise drying the formed biodegradable plant pot. This removes excess water from the pot. Biodegradable plant pots may be dried by any method known in the art, for example, by vacuum, by heating, or by a combination thereof. In particular embodiments, formed biodegradable plant pots are dried in an oven, kiln, furnace, or other heated enclosure heated to an elevated temperature from anywhere between about 200° C. and about 350° C. The required temperature will depend on the amount of water remaining in the formed pots and the biodegradable plant material used to form the pots. PVA forms cross-links at higher temperatures. Therefore, heating pots with added PVA makes them stronger with intramolecular, and possibly also intermolecular, PVA cross-links to the biodegradable plant material. In a particular embodiment wherein the biodegradable plant material is a mixture of peat and pulp, an elevated temperature of from about 250° C. to about 310° C. may be used. In a preferred embodiment, excess moisture is removed from formed pots by vacuum prior to being dried at elevated temperatures.

The method for making a biodegradable plant pot plant described herein may further comprise an after-pressing step. In an after-pressing step, formed pots or formed and dried pots are transferred to a new mold and pressed for from about 0.25 seconds to about 1 second at elevated temperatures between about 130° C. and about 190° C. In a particular embodiment, pots are pressed for about 0.5 seconds at a temperature of about 160° C. This after-pressing step results in a biodegradable plant pot having a smooth surface that provides for easy automatic dispensing, and improves the pot characteristics for use in automated systems.

The pots produced by the methods provided herein possess superior tensile strength, hydrophobicity, and antifungal growth characteristics when compared to standard biodegradable plant pots.

Also provided herein are methods for improving a biodegradable plant pot. An existing biodegradable plant pot may be improved by soaking it in an aqueous solution comprising one or more additives described herein, including wax emulsions, lime to adjust pH, PVA, and PVAC. This method is sometimes referred to herein as the laboratory method. The existing biodegradable plant pot may be comprised of peat fiber, coir, wheat straw, paper pulp, Bagasse fibers, wood fiber, flax, kenaf, sisal, digested manure (from bovine, swine, sheep, chicken, turkey, or the like), or combinations thereof, or any other organic material. By treating or soaking the existing biodegradable plant pot in the aqueous solution comprising the one or more additives, the tensile strength, hydrophobicity, and fungal growth resistance of the existing pot may be improved relative to a non-treated pot.

By soaking or treating existing biodegradable plant pots with one or more additives, the additives are impregnated into the pot, or form a layer on the surface of the pot fibers. As described above and in the examples, the additive content of biodegradable plant pots may be varied in order to provide pots with particular desired characteristics (e.g., increased tensile strength and/or hydrophobicity). In particular embodiments, pots are soaked in an aqueous solution comprising PVA and/or PVAC at w/v concentrations of from about 0.01% to about 10%. In other embodiments, pots are soaked in an aqueous solution comprising PVA and/or PVAC at concentrations of from about 1% to about 5%. In a preferred embodiment, pots are soaked in an aqueous solution of about 2% (w/v) PVA and/or PVAC.

In other embodiments, the aqueous solutions in which the pots are soaked comprise a wax emulsion at a concentration of about 0.1% to about 10% volume/volume. In yet other embodiments the concentration of wax emulsion in the aqueous solution is from about 0.25% to about 5% volume/volume. The wax emulsion used may have a dry wax content of about 20% to about 40%. In a particular embodiment, the wax emulsion has a dry wax content of about 31%.

Various combinations of additives may also be used. The concentration(s) of additive(s) in aqueous solution may be varied in order to achieve an improved pot having one or more desired characteristics.

Besides adjusting the concentration of additive in aqueous solution, the amount of additive impregnated into, or coating, an existing biodegradable plant pot may also be varied by soaking the pot for different amounts of time. For example, the existing biodegradable plant pot may be soaked in the additive-containing aqueous solution for a time ranging from about 30 minutes to about 36 hours. However, soaking non-treated biodegradable plant pots for extended periods of time may compromise their structural integrity (see, e.g. FIG. 1). Therefore, the additive concentration/treatment time must be balanced in order produce pots with adequate additive absorption/coating and tensile strength. Non-treated pots may be soaked for a time ranging from about 12 hours to about 36 hours, or, as in a preferred embodiment, for about 24 hours.

Biodegradable plant pots soaked in additive-containing aqueous solution may be dried following soaking. In certain embodiments, the treated pots are dried in an oven, kiln, furnace, or other heated enclosure heated to an elevated temperature from anywhere between about 150° C. and about 250° C. In other embodiments the treated pots are dried at an elevated temperature between about 190° C. and about 215° C. In a preferred embodiment, pots are dried at a temperature of about 204° C. Pots may be dried for any period of time required to eliminate excess moisture. Dryness may be determined by manual inspection. In a particular embodiment, pots are dried at 204° C. for about 45 minutes. Treated pots may also be allowed to dry at room temperature.

Also provided herein are kits for improving an existing biodegradable plant pot. Kits comprise one or more additive, such as those described herein, including wax emulsions, lime to adjust pH, PVA, and/or PVAC, and instructions for improving the existing biodegradable plant pot. The instructions comprise a description of the method for improving a biodegradable plant pot described herein.

The kit may further comprise elements such as at least one biodegradable plant pot made from one or more materials such as peat fiber, coir, wheat straw, paper pulp, Bagasse fibers, wood fiber, flax, kenaf, sisal, digested manure (from bovine, swine, sheep, chicken, turkey, or the like), or combinations thereof, and at least one container, where the container is of a size capable of containing at least one biodegradable plant pot plant and enough additive-containing aqueous solution to submerge the at least one biodegradable plant pot.

Such kits may be used by laboratories, green houses, nurseries, or individuals in order to strengthen or otherwise improve existing biodegradable plant pots.

EXAMPLES

The following examples serve to explain the present disclosure in more detail. These examples should not be construed as being exhaustive or exclusive as to the scope of the present disclosure.

Example I

Materials and Methods

Polyvinyl alcohol. Polyvinyl alcohol (PVA) was purchased from Sekisui (Kentucky, USA; trade name—Selvol; superfine grade—99% purity).

Wax emulsions. Wax emulsions Michem® emulsion 71731MOD and Michem® emulsion 80939M were purchased from Michelman, Cincinnati, Ohio. The 71731MOD wax emulsion is an anionic paraffin emulsion with a non-volatile content (%) of 30.0-32.0, pH 8.5-9.5, and Brookfield viscosity (cps) below 200. The 71731MOD wax emulsion typically contains about 30-32% solid matter per volume. The 80939M emulsion is a nonionic paraffin wax emulsion with a non-volatile content (%) of 38.5-39.5, pH 10.3-12.3, and Brookfield viscosity (cps) of 450 max. The 80939M emulsion wax typically contains about 38-39% solid matter per volume.

Water immersion of biodegradable plant pots. The dry pot (or plate) was weighed and immersed completely in water for a pre-determined period of time. The pot/plate was removed from water and excess liquid was allowed to drain by leaving it on a tissue for 5 minutes. The weight of the moist pot/plate was measured and compared to its dry weight. This served as a method to determine the water absorption rate of the pot (or plate).

Break point measurements of biodegradable plant pots. Breaking strength is the greatest stress, especially in tension, that a material is capable of withstanding without rupture. Tensile strength is the maximum stress that a material can withstand while being stretched or pulled before failing or breaking.

A Lloyd Instruments LF-plus single column universal testing machine from Lloyd Materials Testing (Bognor Regis, UK) was used to measure the load/breaking strength of the biodegradable plant pots (texture analyzer). Microprocessed control for accurate load measurement and rapid data acquisition was used. A load cell was employed for tension, compression, and cycling through zero force measurements. Load was measured in Newtons against machine extension in millimeters (mm).

Tensile strength was measured on a strip cut from the biodegradable plant pots. The width of the strip was maintained at 1 inch. At least 2 strips were cut from each pot. The tensile instrument Model 922H from Com Ten Industries (St. Petersburg, Fla.) was operated at room temperature. The biodegradable plant pots strips were fixed in the clamp and processed according to the manufacturer's instructions. Pressure was applied until the strip broke apart, and the highest value measured (in kilograms) was recorded. This was the tensile breaking point value.

Plant growth tests. Biodegradable plant pots were filled with container mix (Jiffy Mix #1, Jiffy Products America, Lorain, Ohio).

Zinnia "Candy Cane Red" seeds from Burpee Seed Co. (Warminster, Pa.) were planted in 105 count trays filled with Jiffy Seed Mix 17-1. After approximately 6 days, the seeds germinated and were grown for an additional 14 days until the roots filled the substrate cavity. The Zinnia plant plugs were then transplanted into the biodegradable plant pots with Jiffy Mix #1-container mix. Pots were place outside during normal summer temperature periods and grown until deemed a finished plant. Observations in surface mold and root penetration of the pots were made during this time period.

Making biodegradable plant pots. Examples of methods for forming biodegradable plant pots, and peat pots in particular, are described throughout the present disclosure. Examples of apparatuses and methods for forming biodegradable plant pots are also disclosed in U.S. Pat. No. 2,922,476, which is hereby incorporated by reference in its entirety.

Laboratory-made biodegradable plant pots. Premade biodegradable plant pots were soaked in an aqueous solution of either PVA (e.g. 1, 2, or 5%; w/v) or wax emulsion (e.g. 3% or 5%; v/v). Typically, one pot was soaked for 24 hours in the aqueous solution. The pot was then dried in an oven at 204° C. for about 45 minutes, or for a period until dry (determined by manual inspection).

Factory-made biodegradable plant pots. Peat, or other substrate mix, was screen-sifted to produce fibers. For example, an 8 grade mesh provides between approximately 8% to 12% peat fiber by weight, an 8/70 grade combination mesh provides between approximately 88% to 92% peat fiber by weight, and a 70 grade mesh provides between approximately 0.5% and 2.5% peat fiber by weight. The peat was mixed with water and pulp. Liquid wax emulsion (0.5% v/v) or PVA solution (1-2% w/v) was added to the peat/water/pulp mix. The additives were added initially at 100% total additive volume with 50% total water volume, pre-mixed to allow the chosen additive to be absorbed by the peat and pulp, and then topped up with remaining 50% total water volume.

For example, for making a 0.5% (v/v) wax emulsion peat pot mix in the factory, the premixing was made separately in a Solvo tank. The final peat pot mix with water comprised 15 kg dry CTMP (chemi-thermomechanical pulp), 14.7 kg dry peat, 2000 liters of water, and 10 liters of 71731MOD (wax emulsion; about 31% dry weight). This equals about 0.5% wax (v/v) emulsion mix, or initially about 10.7% wax per dry matter (w/w; dry weight wax vs. dry weight peat/pulp). For 0.25% emulsion (v/v) only 5 liters of emulsion were used for 2000 liters of water. For this large scale manufactured pots, the initial amount of wax-emulsion used has been reduced by 10-fold, volume wise, compared to laboratory production as described herein. The final peat pot mix was made as follows: first, 10 liters of wax emulsion were added to an initial 1000 liters of water; 15 kg CTMP was then added and mixed for 360 seconds; 14.7 kg peat was then added with further mixing for 310 seconds; the remaining 1000 liters of water was finally added, forming a slurry. Total mixing time was 850 seconds.

The slurry was suitable to be pumped/vacuum-sucked into a screen mold in the desired form of a pot. A vacuum removed water from the formed pot. The formed pot was then dried in an oven. In a preferred embodiment, the formed pots are dried in an oven heated to about 250-310 degrees Celsius. Especially in the front of the oven, the temperature is very high and the temperature slowly drops to about 100° C. at the end of the drying period. Pots were dried for about 30 minutes in the oven. This drying procedure was identical to that used for standard peat pots.

For making a 10 cm round peat pot, for example, the same program was run as for the standard pot (no wax emulsion additive) with respect to speed of the machine, temperature in the oven, and time of drying. No problems with pots hanging on the rubber cups or drying in the form were encountered. Addition of the wax emulsion did not affect production.

Alternatively, the additives (wax emulsion and/or PVA; each one separately) were added to a slurry having a ratio of 55/45 of peat to pulp by weight. This slurry can be mixed together for any desired duration. For example, the slurry can be mixed for approximately fourteen minutes before further processing.

In some cases, optional after-pressing of pots was performed after the pots came out of the oven by applying another heating step. Pots were placed in a new mold and pressed at 160° C. for 0.5 seconds. This gave the pots a smooth surface, allowing easy automatic dispensing.

In an alternate embodiment, a strengthened peat or coir pot can be formed in accord with the apparatuses and methods disclosed in U.S. Pat. No. 2,922,476, wherein the fiber pulp used to form the pot is strengthened with the additives prior to forming the pot. Heating the peat or coir with these chemicals makes the wax emulsion form a hydrophobic layer on the peat surface, which impregnates the pot fibers with a water resistant layer until the layer breaks down. PVA crosslinks upon heating, thereby creating a stronger biodegradable plant pot. It is also possible to replace some of the pulp/cellulose with PVA to save on production costs.

Figure 1D:
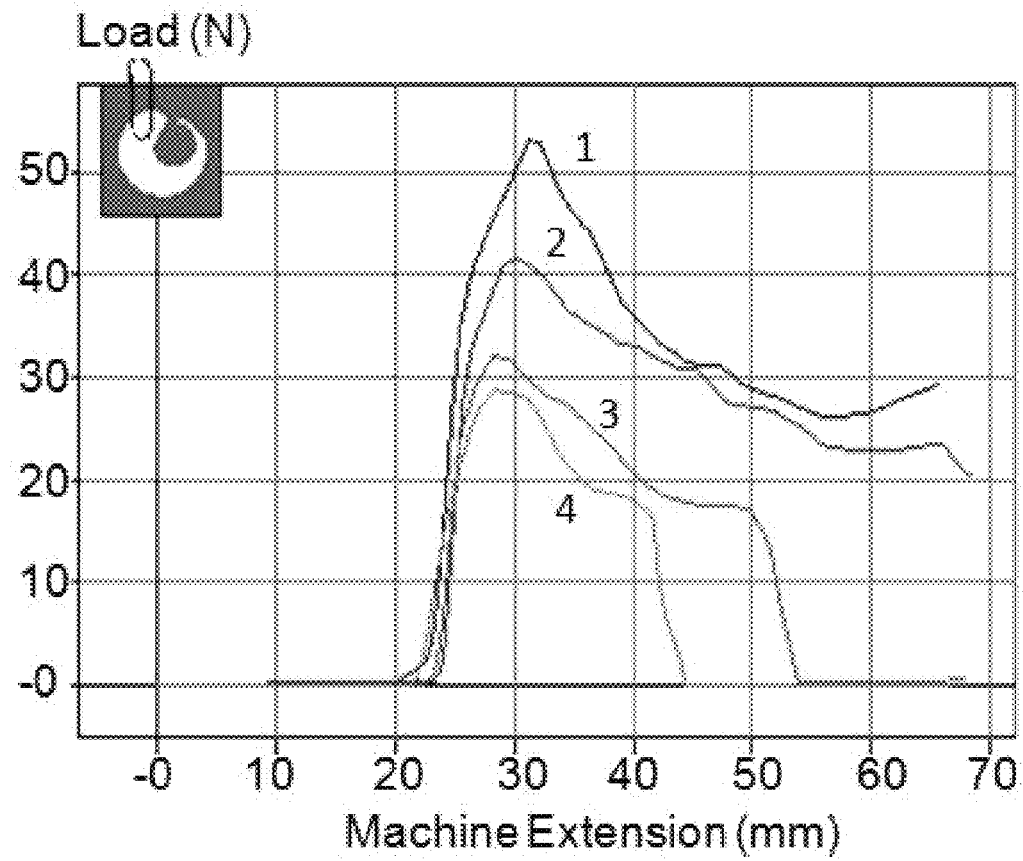
Figure 2:
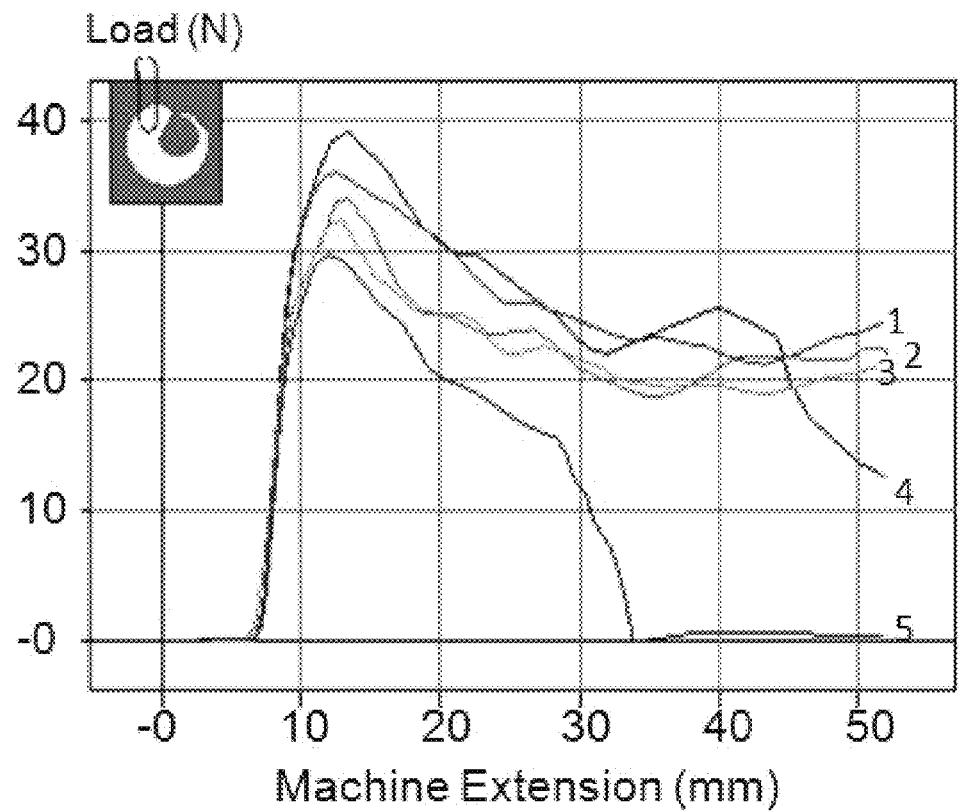
FIG. 2: Load testing of laboratory made wax emulsion pots in a texture analyzer after 24 hours soaked in water. A Force plot showing load testing results of standard peat pot (purple line; 5), peat pot made with 5% (v/v) 717315 wax emulsion (black line; 4), 3% (v/v) 717315 wax emulsion (red line; 1), 5% (v/v) 809395 wax emulsion (green line; 2), and 3% (v/v) 809395 wax emulsion (gold line; 3) is depicted.
Figure 3:
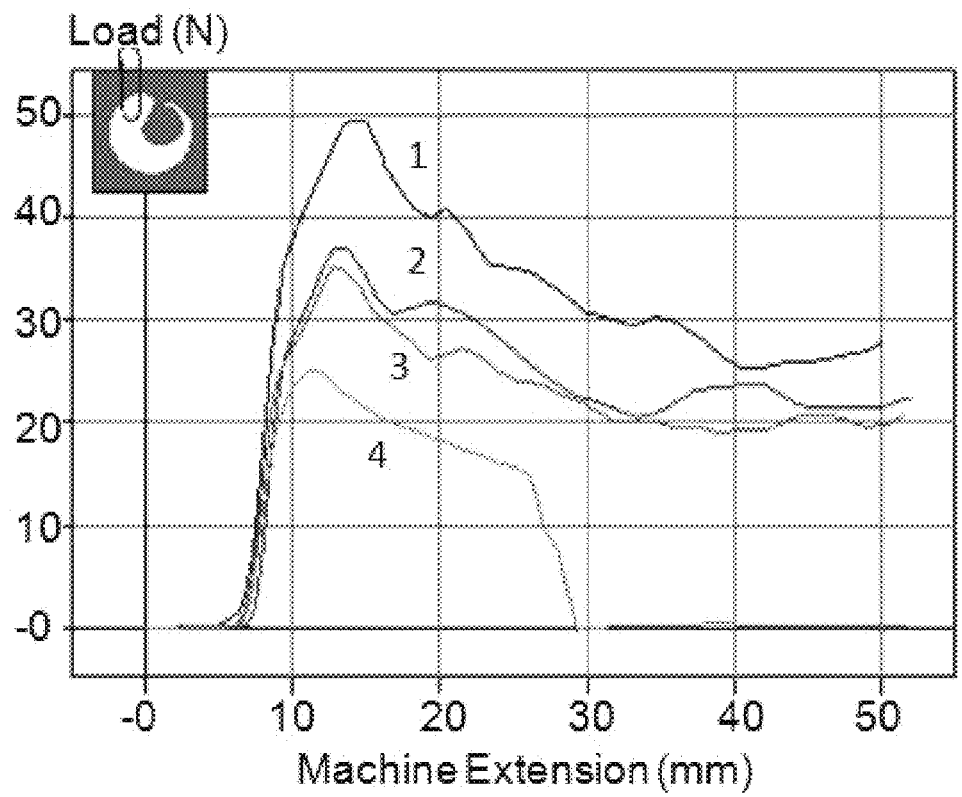
FIG. 3: Load testing of laboratory made wax emulsion pots/PVA pots in a texture analyzer after 24 hours soaked in water. A Force plot showing load testing results of standard peat pot (gold line; 4), peat pot made with 2% (w/v) PVA (black line; 1), 3% (v/v) 71731 wax emulsion (red line; 2), 3% (v/v) 71731, and 1.5% (w/v) PVA (green line; 3) is depicted.

Laboratory-Made Biodegradable Plant Pots Exhibit Increased Tensile Strength, Hydrophobicity, and Fungus Resistance Laboratory-made peat pots were soaked in water for different times and then load-strength tested. While technically a force/breakpoint measurement is taken, a tensile property may be observed as a strength factor over distance. FIG. 1 illustrates the load testing of laboratory-made PVA peat pots (1-5% w/v) and standard peat pots soaked in water for either 10 minutes (FIG. 1A), 1 hour (FIG. 1B), 24 hours (FIG. 1C), or 7 days (FIG. 1D). Just after 1 hour, the standard peat pot was weakened. The same effect was only seen for PVA pots after 7 days in water for the lowest concentration of PVA (1%). The larger concentrations 2% (w/v) and 5% (w/v) of PVA added to peat pots made the pots retain their structural integrity even after 7 days in water. FIG. 2 illustrates load testing of wax emulsion peat pots (3-5% v/v) and standard peat pots after 24 hours. The standard peat pot was already weakened after 24 hours, while peat pots comprising one of the two different wax emulsions, 71731MOD and 80939M, retained their structural integrity. Peat pots comprising both PVA (1.5% w/v) and 71731MOD (3% v/v) also retained pot strength longer than the standard peat pot (FIG. 3).

Figure 4A:
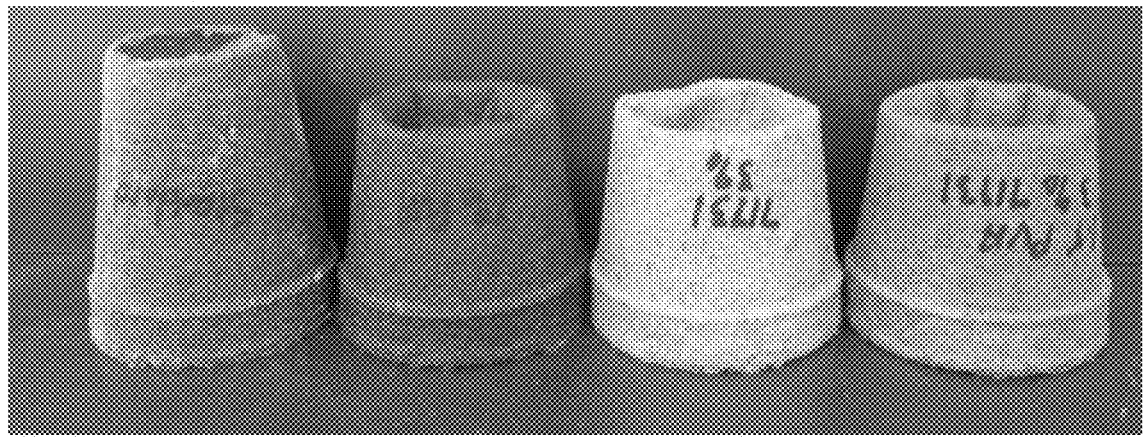
FIGS. 4A-4B: Photographs of wetted laboratory made peat pot after texture analyzer impact force measurement. Peat pots were first incubated for 24 hours in water before tested in texture analyzer. From left to right are the standard peat pot (far left), then peat pot treated with 2% (w/v) PVA, peat pot treated with 3% (v/v) wax emulsion 71731, and at the far right is the peat pot treated with both 3% (v/v) 71731 and 1.5% (w/v) PVA.
Figure 4B:
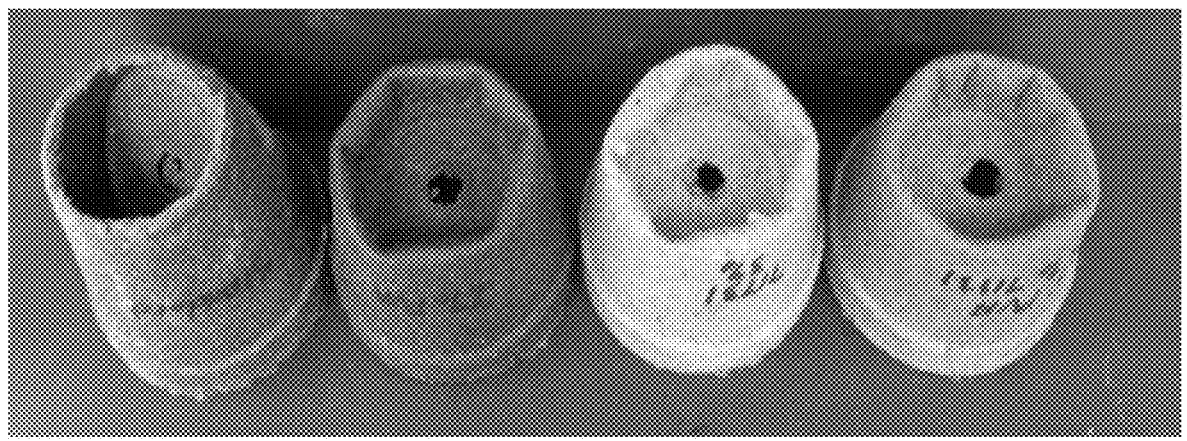

Peat pots with PVA, wax emulsion, or a combination thereof, were compressed without being broken, whereas the base of the standard peat pot was broken and released from the sidewalls upon applying force (FIGS. 4A-4B; standard peat pot at far left in both panels).

The colors of the peat pots depicted in FIG. 4 demonstrate the difference in water absorption between the various pots. The darkest pots, the standard peat pot and the peat pot with 2% w/v PVA, were the wettest. The peat pot with 3% v/v wax emulsion 71731MOD displayed the lightest color, indicating minimal—if any—water absorption. Moderate water absorption was observed with the PVA/wax emulsion peat pot, showing an intermediate color (FIG. 4).

Figure 5:
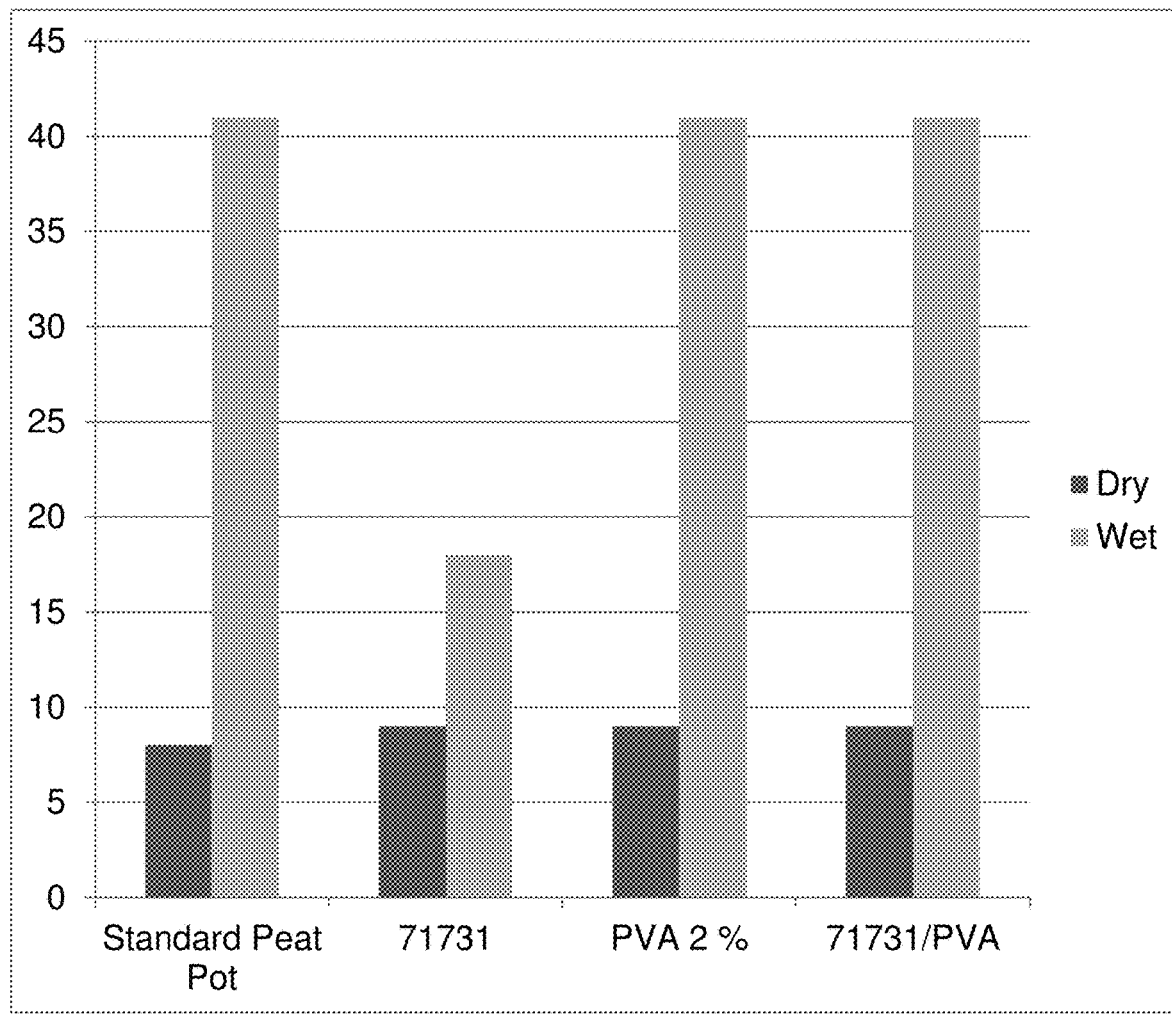
FIG. 5: Bar graph showing water absorption of different laboratory made peat pots. The weight of peat pots (in grams) is illustrated for different types of dry peat pots (as described in FIGS. 3-4) (dark gray bars) and peat pots immersed in water for 24 hours (light gray bars). The weight of wet peat pots includes the amount of water absorbed.

To further investigate water absorption by the various peat pots, the pots were immersed in water for a period of 24 hours. Peat pots were weighed following in-laboratory production (described above) and after soaking in water (FIG. 5). Peat pots coated with the wax emulsion 71731MOD had much lower weight following soaking compared to the other pot types, indicating lower water absorption of the 71731MOD-coated peat pots. Without wishing to be bound by theory, this is due to the hydrophobicity of the peat pot surface that results from the wax emulsion coating, preventing water absorption.

Figure 6:
FIG. 6: Photograph showing plant growth test in laboratory made wax emulsion peat pot vs. standard peat pot. The wax emulsion 71731 peat pot is on the left and the standard peat pot is on the right. Peat pots were filled with container mix (Jiffy Mix #1), and planted with common hemlock or *Tsuga canadensis*. The planted peat pots were stored outside for 4 months.

Peat pots comprising PVA and/or wax emulsions were further tested in plant growth trials. The various peat pot formulations were filled with container mix substrate (Jiffy Mix #1) and planted with common hemlock or *Tsuga Canadensis*. Planted peat pots were stored for 4 months outdoors. The peat pot treated with wax emulsion 71731MOD remained in very good condition for the duration of the trial, its light color suggesting that it had absorbed minimal water (FIG. 6). Conversely, the standard peat pot was broken, and appeared to have absorbed a considerable volume of water. The trial further illustrated the tensile strength differences between the two peat pots.

Figure 7A:
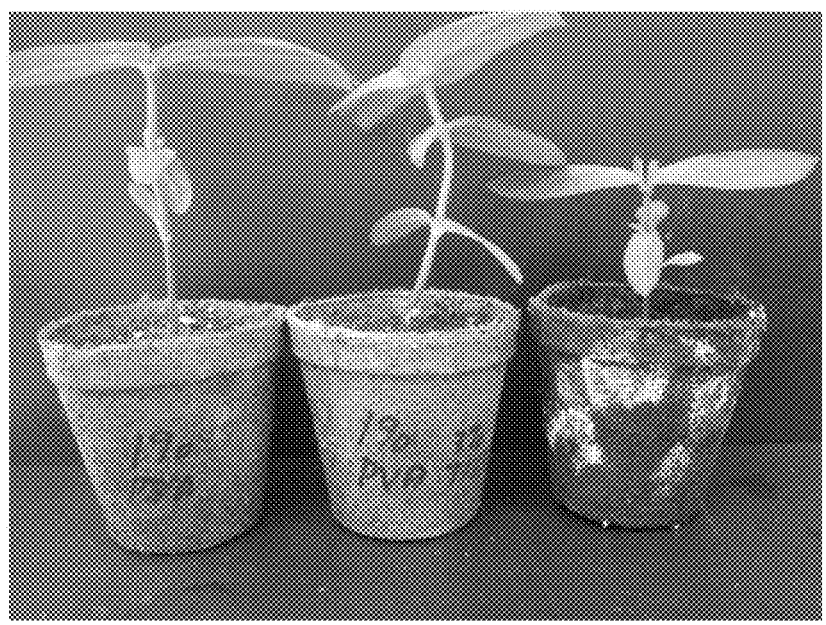
FIGS. 7A-7B: Photographs showing plant growth tests in different laboratory made peat pots.
Figure 7B:
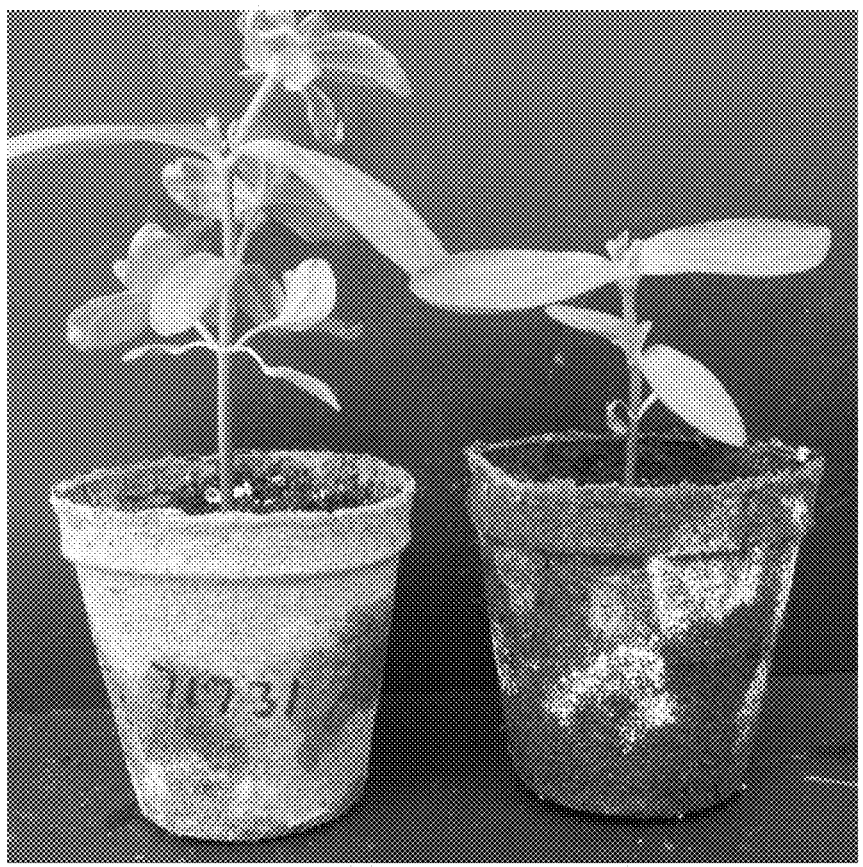

Further plant growth trials were conducted with 1% (w/v) PVA-treated peat pots, comparing these pots to peat pots treated with 1% (w/v) PVA/3% (v/v) 71731MOD and standard (untreated) peat pots (FIG. 7). Peat pots treated with either 1% (w/v) PVA or 1% (w/v) PVA/3% (v/v) 71731MOD displayed moderate water absorption, as evidenced by their intermediate color. The standard peat pot on the other hand, was dark in color, indicating considerable water absorption. The standard peat pot also displayed substantial development of fungi. The peat pots treated with PVA, the wax emulsion, or a combination of the two additives showed resistance to peat fungi development (FIG. 7).

Figure 8:
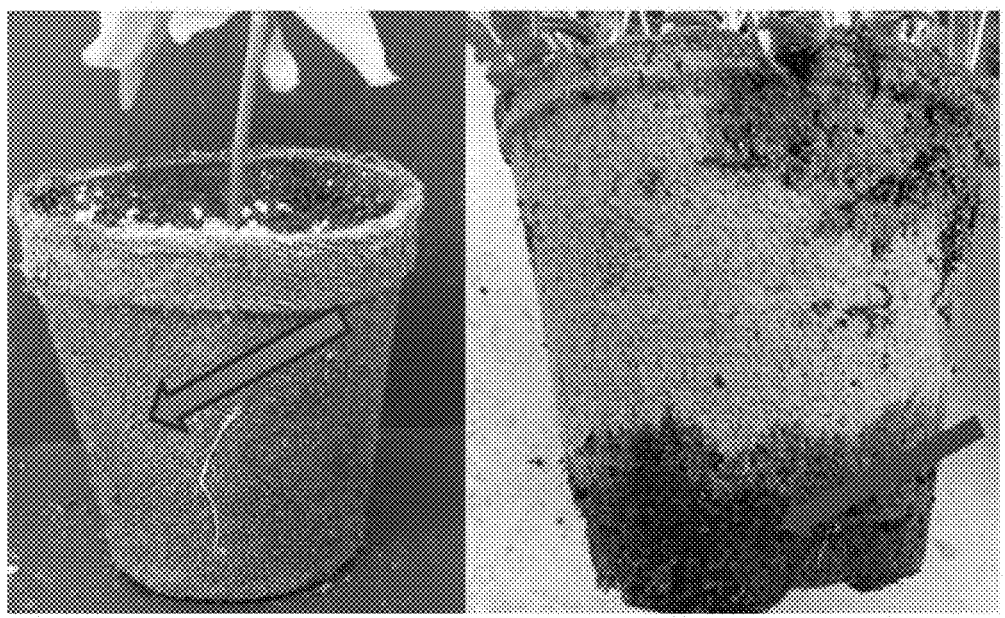
FIG. 8: Photographs showing root penetration through laboratory made peat pots made with 1% (w/v) PVA and 5% (v/v) 71731 wax emulsion Zinnia, an ornamental annual, planted in a 1% (w/v) PVA peat pot filled with container mix (Jiffy Mix #1), demonstrated root penetration through the pot wall surface (blue arrow), whereas Campanula planted in the 5% (v/v) 71731 wax emulsion peat pot to the right, had emerging root penetration where the pot started to decompose (red arrow).

An advantage of peat and coir pots is that root penetration through the pot wall or bottom is possible, thereby facilitating direct planting of the pot in the field. This is not possible with plastic pots without introducing extra holes in the pot wall. The additive-treated peat pots were observed to determine whether plants planted in these pots displayed root penetration through the pot wall (FIG. 8). The 1% (w/v) PVA peat pot and the 3% (v/v) 71731 wax emulsion pot. The 1% (w/v) PVA-treated pot had root penetration through the pot wall surface. However, the wax emulsion treated pot only had root penetration after the pot started to decompose. Rooting was appearing from the wet part of the wax emulsion pots (FIG. 8).

Figure 9A:
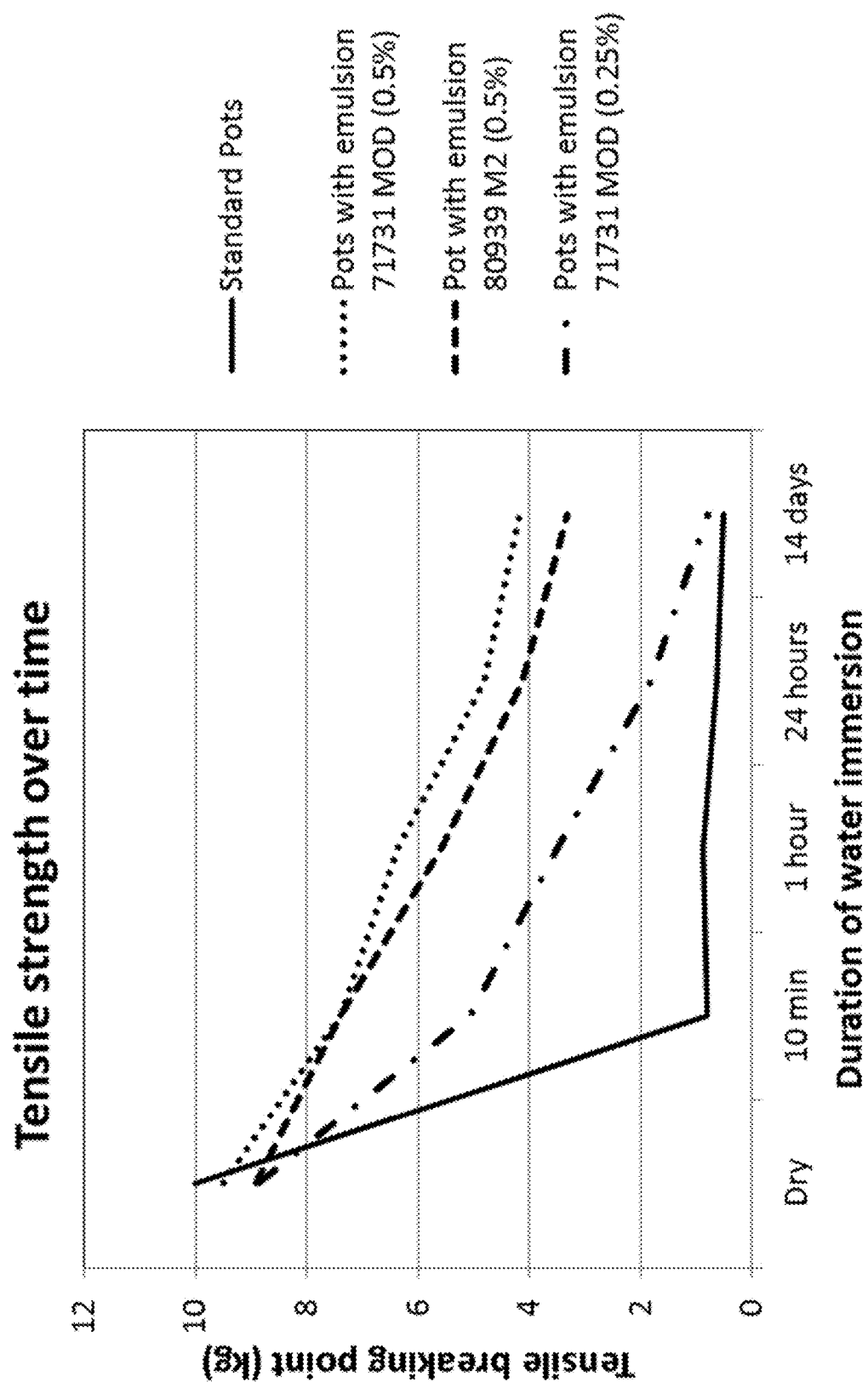
FIGS. 9A-9B: Physical analysis of factory made wax emulsion-made peat pots after soaking in water for up to 14 days.
Figure 9B:
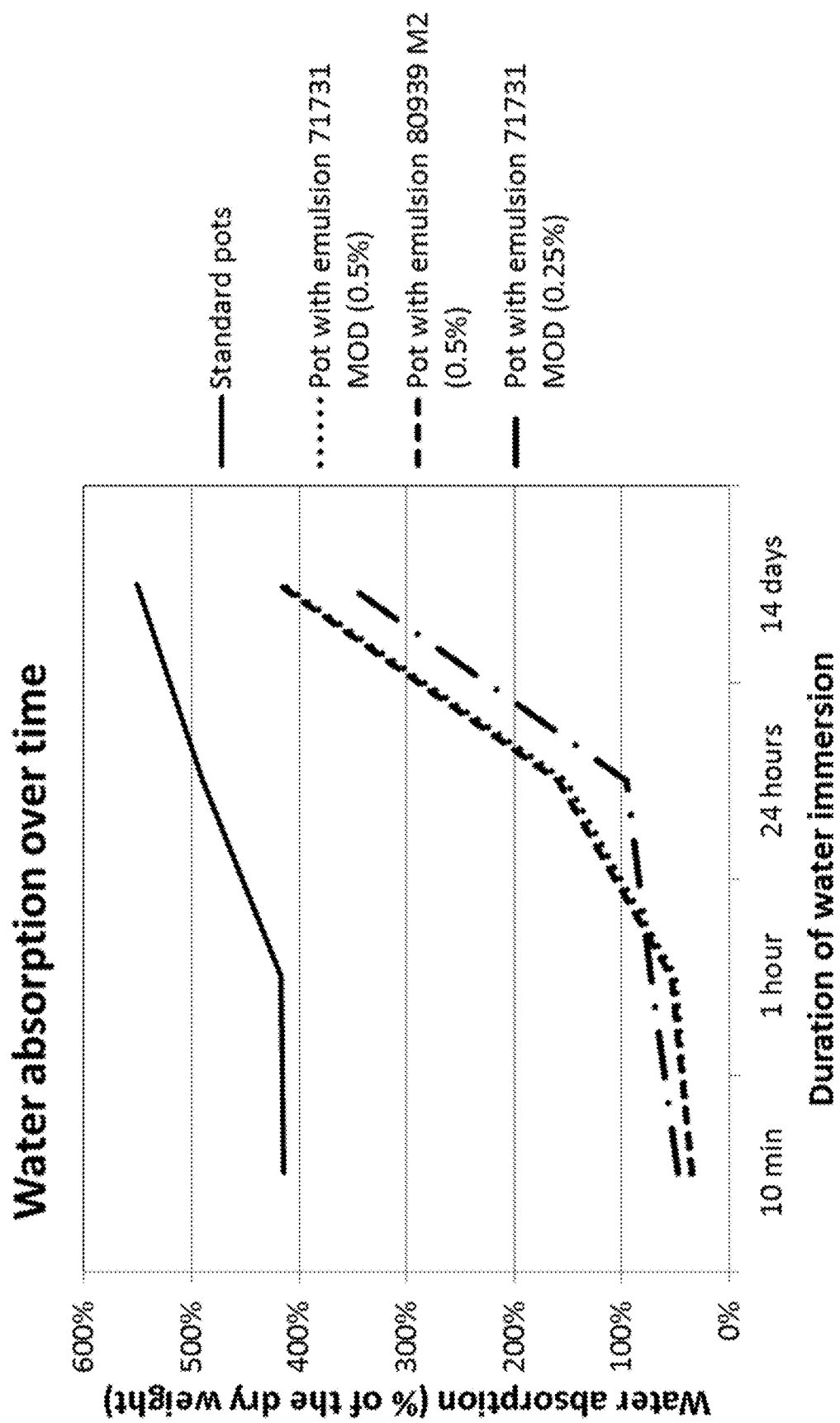

Factory-Made Biodegradable Plant Pots Exhibit Increased Tensile Strength, Hydrophobicity, and Fungus Resistance Peat pots comprising two different wax emulsions—71731MOD and 80939M—were made in the factory in larger batches than described above. The peat pots were tested with respect to tensile strength and water absorption over time (FIG. 9). The initial concentration of wax emulsion added to peat/pulp was reduced from 5%, as used in the laboratory-made pots, to 0.5% (v/v) for the factory production run. The strongest pots made were those comprising wax emulsion 71731MOD (FIG. 9A). Peat pots comprising wax emulsion 80939M were slightly weaker. The peat pots comprising wax emulsions 71731MOD and 80939M were similar with respect to their hydrophobic behavior, or water resistance (FIG. 9B). The wax emulsions both produced stronger and more hydrophobic peat pots than the standard peat pots.

Figure 11A:
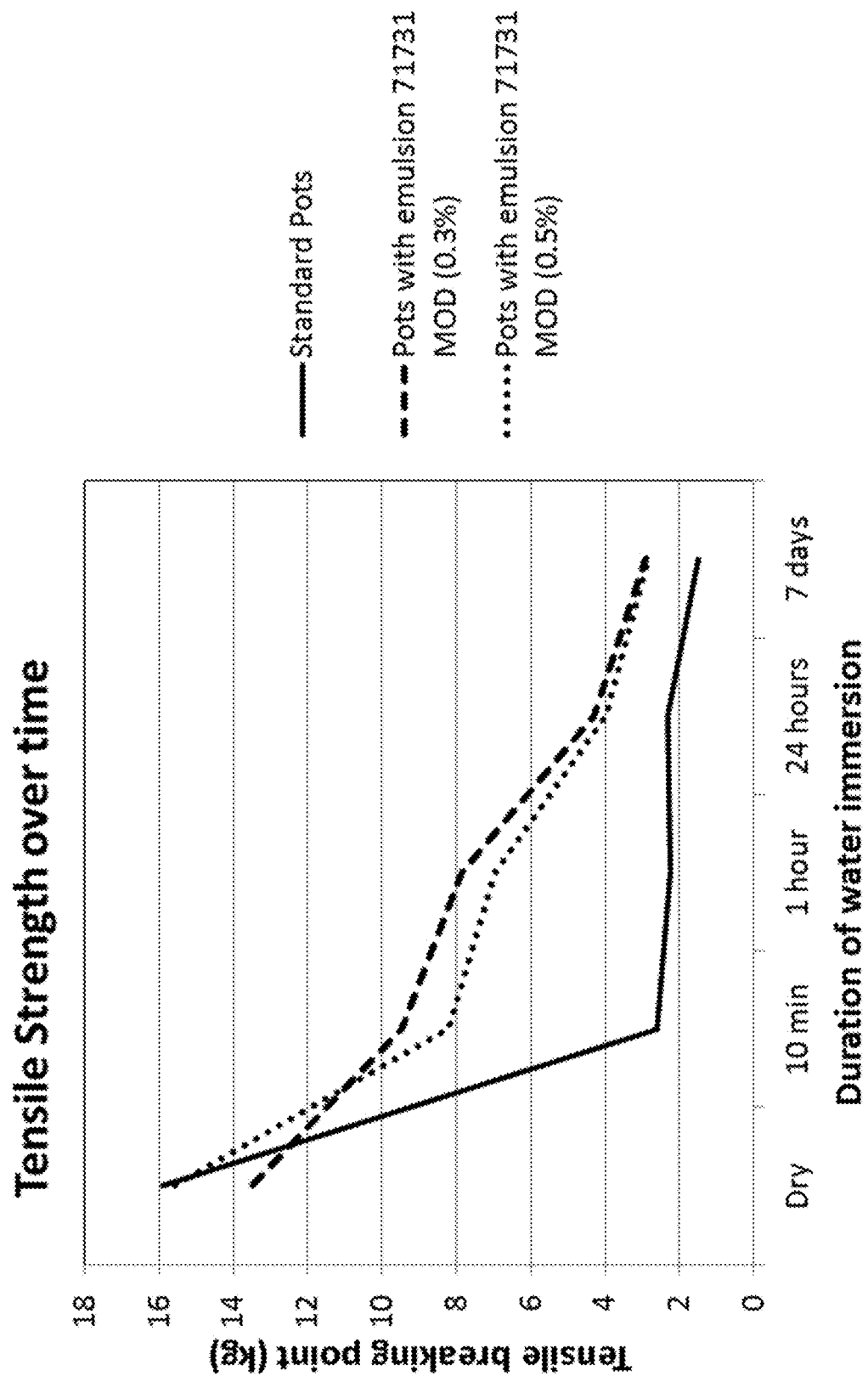
FIGS. 11A-11B: Physical analysis of factory made wax emulsion made peat pots after soaking in water for up to 7 days.
Figure 11B:
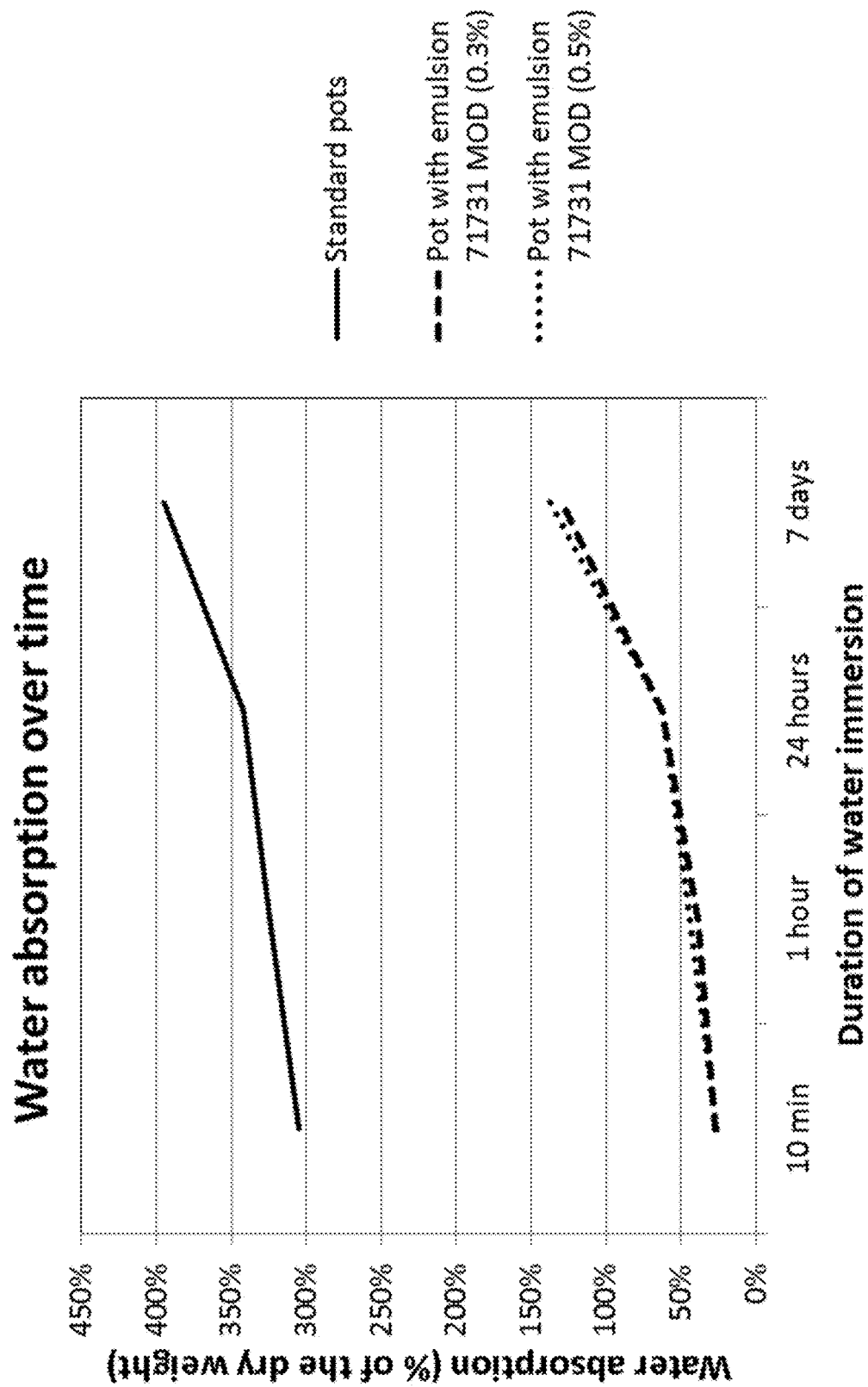

Similar results were observed for peat pots produced at a second factory (JNB factory; FIG. 11). Comparing results from pots produced at the JAS factory (FIG. 9), it is evident that it is possible to reproduce results despite pots being made at different factories, with different production tools, such as peat substrate mix, pot pressing tools, and oven conditions. Peat pots comprising wax emulsion 71731MOD were stronger and more hydrophobic than the standard peat pot (FIGS. 9 and 11)

Figure 10A:
FIGS. 10A-10B: Photographs showing plant growth trials in factory made wax emulsion peat pots.
Figure 10B:

Factory-made peat pots comprising the wax emulsions further demonstrated improved characteristics during plant growth trials (FIG. 10). Peat pots comprising wax emulsion 71731MOD demonstrated the least amount of water absorption relative to peat pots comprising wax emulsion 80939M or untreated standard peat pots (FIG. 10A). This can be visualized by the color of each pot, with lighter color indicating lower water absorption. Water absorption by peat pots comprising wax emulsion 80939 showed intermediate water absorption, while standard peat pots displayed considerable water absorption.

Laboratory-Made, Low Wax Emulsion Peat Pots

Lower concentrations of wax emulsions than those used above were tested in laboratory conditions. The same amount of emulsion per liter was used as for the factory-made pot manufacturing conditions.

Figure 12A:
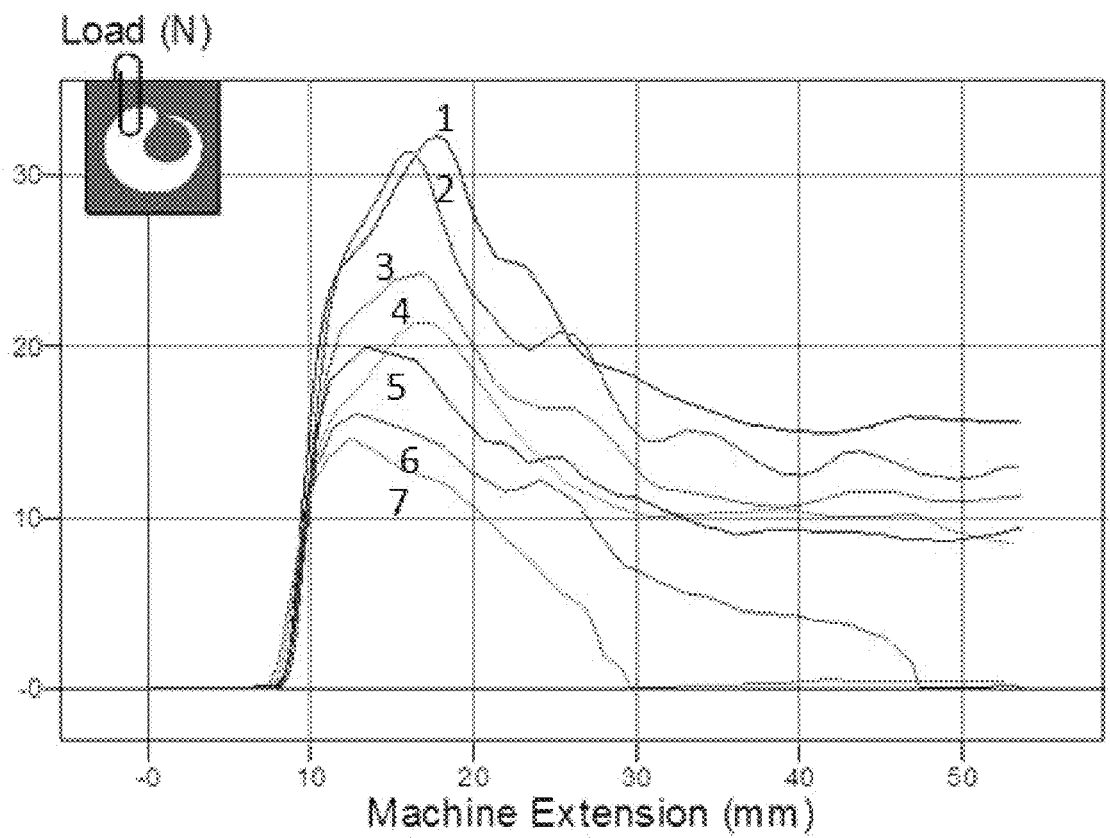
FIGS. 12A-12B: Load testing of factory made wax emulsion pots/PVA pots in a texture analyzer after 1 hour soaked in water.
Figure 12B:
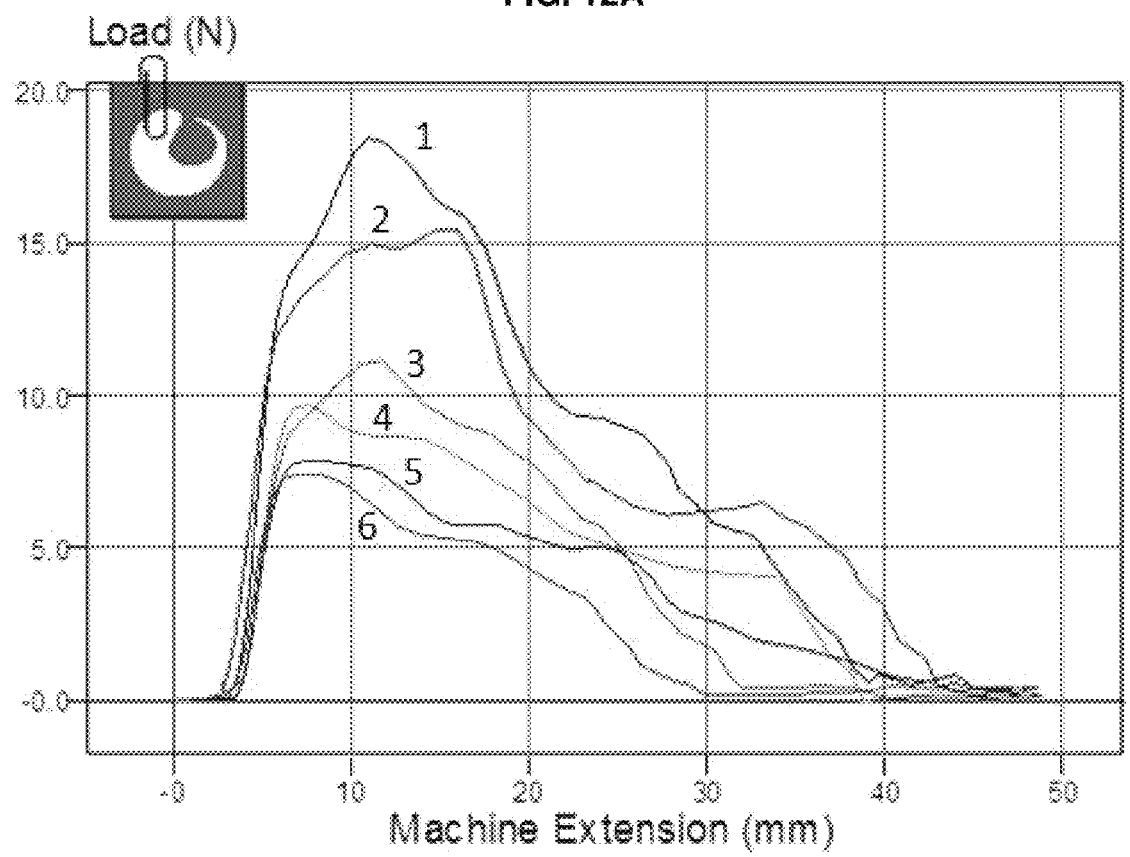
Figure 13:
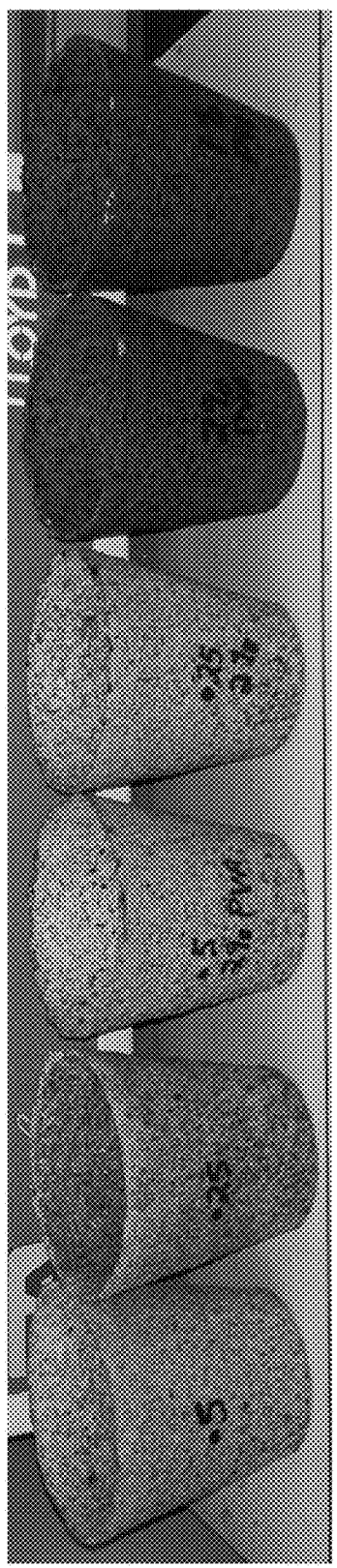
FIG. 13: Photograph showing laboratory made wax emulsion pots/PVA pots after 1 hour soaked in water. From left to right: pot made with 0.5% v/v 71731 (far left); pot made with 0.25% (v/v) 71731; pot made with 0.5% (v/v) 71731 and 2% (w/v) PVA; pot made with 0.25% (v/v) 71731 and 2% (w/v) PVA; pot made with 2% (w/v) PVA; and pot made with 1% (w/v) PVA (far right).

Pots were soaked for 24 hours in aqueous solutions comprising wax emulsion and then dried at 204° C. for about 45 min. Pots were then soaked in water for 1 hour before load testing measurements. Load testing results for coir and peat pots using different treatments are shown in FIG. 12. Standard pots (with no treatment) were the weakest. There was an additive strengthening effect of PVA and wax emulsion on both peat and coir pots. The experiments also confirmed that lower concentrations of wax emulsion 71731MOD, down to 0.25% (v/v), produced relatively strong pots in the laboratory. However, from this experiment, wax emulsion alone relative to PVA, had better effect on peat pots (FIGS. 12A and 12B). The opposite was found for PVA alone relative to wax emulsion, improving coir pot strength more than for peat pots. FIG. 13 shows that wax emulsion also was able to make water resistant coir pots. Pure PVA pots were darkened, indicating that they absorb water more than the other treated pots.

Example II

Polyvinyl acetate, polyvinyl alcohol, a cationic wax emulsion, and combinations of PVAC or PVA with either cationic or anionic emulsions, were tested with good efficacy in the manufacturing of peat pots. PVAC and PVA offered a good water resistance and very good added strength to wax emulsion pots. Also, mold growth was reduced due to drier pots obtained by the combination of wax emulsion with PVA/PVAC, or by increasing pH up to pH 7 with lime.

Materials and Methods

PVAs from several different companies were tested. From Sekisui: Selvol 165SF. Viscosity 62-72 cps (high molecular weight). Selvol E575: The MW is between 180,000-215,000 (86-89% hydroxy groups; 11-14% acetate groups). Selvol 350: Viscosity 62-72 cps. MW is between 172,000-186,000 (98% hydroxy groups; 1-2% acetate groups). Solubility in water for high-molecular weight PVAs from Sekisui is typically about 5-9%. From Intercol (The Netherlands): VA101, VA102 (88% hydroxy groups; 12% acetate groups), PVA premade solution; 15% solids per liter.

PVAC: VA710-50% solids per liter, emulsion. From Henkel: Aquence LA 0276 emulsions. From Owensboro Specialty Polymers, Inc. Owensboro, Ky. 42303: DARATAK® 56L; 54-56% solids. This is a very high molecular weight PVAC polymer with a low emulsion viscosity and good tensile strength. From Franklin Adhesives & Polymers, Columbus, Ohio 43207: Duracet 300—Polyvinyl aceate with high molecular weight.

In addition to the anionic wax emulsions 71731MOD and non-ionic wax-emulsion ME80939M, purchased from Michelman, Cincinnati, Ohio, a cationic wax-emulsion from Michelman was also tested. The 73550 wax emulsion (Scale wax) is a cationic paraffin white emulsion with a Non-Volatile (%) of 49.5-50.5% (solid matter), pH 4.5-6.6, and Brookfield viscosity (cps) below 500. The recommended pH of the system is below pH 7.0.

Medium/fine peat fraction 0-10 was from Jiffy Products N.B., Shippagan, New Brunswick, Canada. Lime ($CaCO_3$—$MgCO_3$) was purchased as Dolomite lime from National Lime & Stone Carey, Ohio, USA. CTMP (Chemi-Thermo Mechanical treated Pulp) containing 80% spruce and 20% pine, was supplied from Waggeryd Cell AB, Vaggeryd, Sweden, and TMP pulp (spruce) (Thermo Mechanical treated Pulp) from White Birch Paper Co., Quebec, Canada.

In this Example, the methods of water immersion of plant growth containers, breaking point measurement using a texture or tensile strength analyzer, plant growth, and making peat pots/plant growth containers, were the same as those used in Example I.

Making Treated Plant Growth Containers in Solutions of PVA, PVAC, or Emulsion Wax in Laboratory Premade pots, made from the recipe described in U.S. Pat. No. 2,922,476, were soaked in solution of either PVA (e.g., 1, 2, or 5% w/v), PVAC solution (up to 10% w/v), or wax emulsion (e.g., 3% or 5% v/v) in water. Typically, one pot was soaked for 24 hours in the chemical water solution. The pot was then dried in an oven at 204° C. for about 30-45 minutes, or for a period until dry (based on a manual inspection).

Making Peat Plates for Laboratory Testing of Water Uptake and Load Strength

In a 4 liter CB-16 mixer (Waring Commercial, Shelton, Conn., USA; 3 speeds: 15,800-20,800 RPM), 19.4 gram of medium/fine peat fraction 0-10, 18.4 g of CTMP (Chemi-thermo mechanical treated Pulp) or TMP (thermomechanical treated) pulp, and either 0, 0.3, or 0.6 g lime ($CaCO_3$—$MgCO_3$) were added to 2 liters of water. Wax emulsion (14.4 g of 71731 or 73550) and/or potassium sorbate (2%; w/w) may be included as well. If needed, 7 ml of 5.5% (w/v) PVAC stock solution was added to get 1% (w/w) PVAC solution (weight dry matter PVAC/weight peat and pulp), to complete the additives to the slurry. The amount of each ingredient will always vary depending of the amount of dry matter the user is seeking and the original moisture content of each ingredient. However, there is generally 2 liters of water. The temperature on the slurry was kept at 20° C. For making plates, 80 ml of slurry was removed and poured from the measuring cup to the recipient metal filter mounted on the 3"×3" Buchner funnel. It was ensured that the slurry recovered the screen inside the recipient evenly. Vacuum was applied on the filter flask via a vacuum trap. A rubber disk was mounted on top of the peat plate (on top of the metal filter/recipient). After pressing the plates, they were baked in oven/dried at 225-250° C. for 60 minutes. The time in the oven was adjusted to obtain a final moisture content of 3-8%.

Making Emulsion or PVA/PVAC Strengthened Peat Plant Growth Containers in Factory Peat, or other substrate mix, was screen sifted to produce peat fibers. For example, an 8 grade mesh provides between approximately 8% to 12% peat fiber by weight, an 8/70 grade combination mesh provides between approximately 88% to 92% peat fiber by weight, and a 70 grade mesh provides between approximately 0.5% to 2.5% peat fiber by weight. The peat was mixed with water and pulp. Liquid wax emulsion (0.5%) and/or PVA/PVAC solution (0.1-3%; w/w) was added to the peat/water/pulp mix. The chemicals were added initially in a ratio of 100% chemical with 50% water, premixed to allow the chosen chemical to be absorbed by the peat and pulp, and then topped up with remaining 50% water.

As a non-limiting example, for making 0.5% (v/v) wax emulsion peat pot mix in the factory, the premixing was made separately in a solvo tank. The peat pot mix with water was composed of 15 kg dry CTMP (Chemi-Thermo Mechanical Pulp), 14.7 kg dry peat, 2000 liters of water, and 10 liters of 71731 MOD (wax emulsion; about 31% dry weight). This equals about 0.5% wax (v/v) emulsion mix, or initially about 10.7% wax per dry matter (w/w; dry weight wax vs. dry weight peat/pulp). For 0.25% emulsion (v/v), only 5 liters of emulsion were used for 2000 liters. (Note: for this large scale, the initial amount of wax-emulsion was reduced by 10-fold, volume wise, compared to laboratory production as described above). The mix was made in the following order: First, the initial 1000 liters of water was added to 10 liters of wax emulsion. Then, the CTMP was added and mixed for 360 seconds. Then, peat was added with further mixing for 310 seconds. Finally, the remaining 1000 liters of water was added. Total mixing time was 850 seconds. For making a 10 cm round peat pot, the same program was run as for the standard pot with respect to speed of the machine, temperature in the oven, and time of drying (as mentioned above). There were no problems with pots hanging on the rubber cup or drying in the form. Production was very smoothly completed.

When PVA or PVAC was applied during the manufacturing of peat and coir pots with wax emulsion, they were added as premade solutions to the solvo tank. The PVA was initially made as a stock solution, according to Sekisui instructions (boiling/stirring). The solubility of the high molecular weight solid PVA in water was only 7%, limiting the stock solution of PVA to 700 gram per 10 liter. Premade PVA solutions (e.g. from Intercol) or PVAC emulsions were added direct to solvo. The concentrations used were from 0.1% to 3% of the chemicals (weight percent PVA/PVAC per total weight CTMP/peat). For example, 150 gram PVA was added to 30 kg peat/CTMP solids to get 0.5% PVA, or 600 gram PVA (10 liter of 60 g PVA/liter solution) for a similar amount, to give 2% PVA pots. For adding PVAC, the amount used was typically lower: 0.1-2% solid matter per solid matter peat/CTMP (w/w).

In another version, the additive chemical (each one separately) was added to obtain a slurry having a ratio of 55/45 of peat to pulp by weight. The slurry was mixed together for a desired duration. In one example, the slurry was mixed for approximately fourteen minutes before further processing. The slurry was then pumped/vacuum sucked into a screen mold in the desired form of a pot. A vacuum removed water from the formed pot. The formed pot was then dried in an oven.

The formed pots were dried in an oven heated to about 250-310 degrees Celsius. Especially in the front of the oven, the temperature was very high and the temperature slowly dropped to about 100 degrees at the end of the oven period. Pots were dried for about 30 minutes in the oven. This is the drying procedure for standard Jiffy Peat Pots.

After-pressing of pots was made after the pots came out of the oven by applying another heating step. Pots were placed in a new mold and pressed at 160 degrees Celsius for 0.5 seconds. This gave the pots a smooth surface to easily provide automatic dispensing.

In an alternate example, the strengthened peat or coir pots were formed in accord with the apparatuses and methods disclosed in U.S. Pat. No. 2,992,476 (incorporated herein by reference), wherein the fiber pulp used to form the pot is strengthened with the chemicals prior to forming the pot. Heating the peat or coir with these chemicals makes the wax emulsion form a hydrophobic layer on the peat surface, which impregnates the pot with a water resistant layer until this layer breaks down. PVA forms intramolecular crosslinks upon heating, which makes a stronger wet pot. It is possible to replace some of the pulp/cellulose by PVA to save on production costs.

pH Dependency of Wax Emulsion Pots

A recipe for making peat/pulp pots was checked with respect to pH. In general, all pH values of slurry for making peat/pulp pots were around pH 5.0, and in the range of pH 3.9 to pH 5.5. By the addition of lime, it is possible to elevate pH to pH 6-7. The ME71731M emulsion has a recommended pH of 7 or above. The product itself runs between pH 8.5-9.5. If the pH falls below 7.0, the emulsion can break out. If the emulsion breaks, it is easy to note as it is not a process that takes time to develop. Furthermore, the emulsion will stay separated if it breaks. An alternative wax emulsion is the cationic wax emulsion ME73550 (for Europe: Michelman ME70350.A.E.). This product has a pH of 5, which can make a difference to the process. The behavior of 73550 is similar to 71731 with respect to wax coating, but has the advantage of being stable in lower pH systems.

Laboratory Testing of Polyvinyl Acetate (PVAC) Added to Peat Pots and Peat Plates PVA can be made from PVAC by the use of NaOH/Methanol. PVAC, which is also called Elmer's glue™, has a white color, while PVA is a transparent solution. PVAC is insoluble in water and is sold as an emulsion, while PVA is 100% soluble in water. PVA may be fully hydrolysed (all —OH group), but may also be partly hydrolysed (85-90%), having in addition 10-15% acetate groups. Thus, PVAC is more hydrophobic and contributes stronger to produce drier surfaces than PVA. The strength of the polymer is dependent on the degree of polymerization: longer polymers or higher molecular weight give stronger products, such as stronger peat pots.

Figure 14:
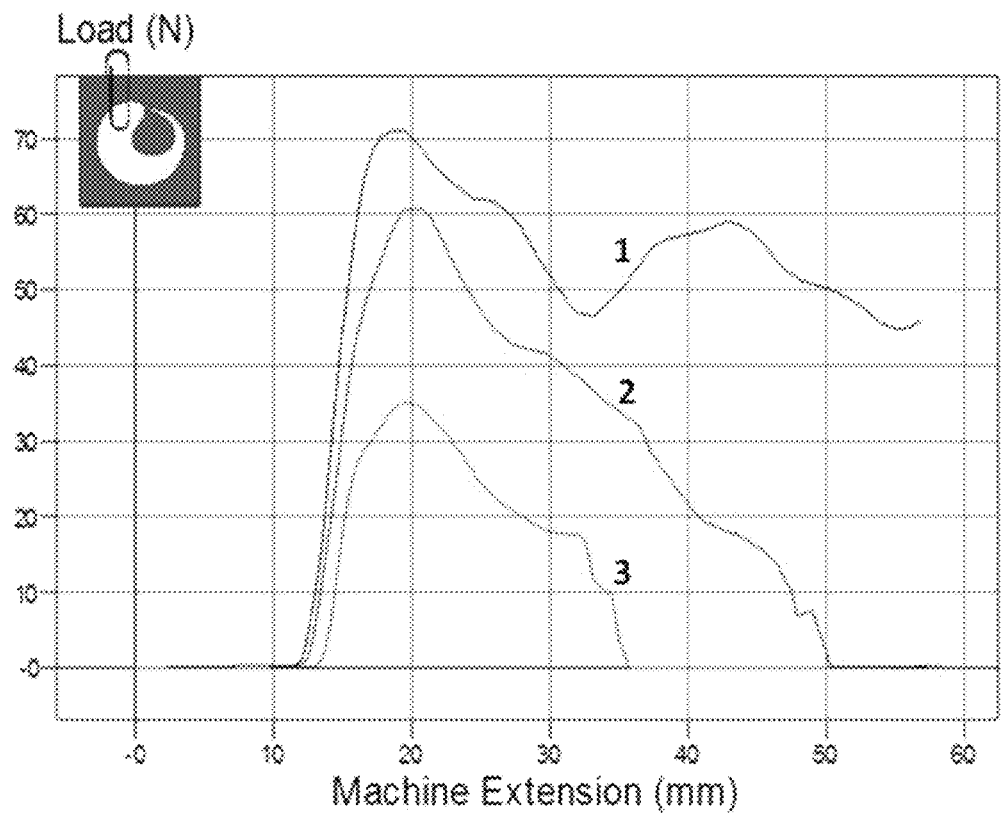
FIG. 14: Load testing of laboratory made PVA/PVAC pots after 24 hours soaked in water. The black line (labeled 1) shows load testing of peat pot prepared with 10% (w/v) PVAC (Aquence LA 0276 from Henkel). The red line (labeled 2) shows load testing of peat pot prepared with 2% (w/v) PVA. The green line (labeled 3) shows load testing of a standard peat pot.

Standard peat pots were soaked in a solution of PVA or PVAC. As a starting point, 10% (w/v) solution of PVAC and 2% PVA (w/v) were used. Pots were soaked in PVA or PVAC solution for just 1 hour, than they were dried in an oven. Then, the pots were soaked for 24 hours in water, and tensile strength/breaking point was measured with load testing as shown in FIG. 14. As seen in FIG. 14, both PVA and PVAC strengthened the peat pots compared to the non-treated pot.

Peat plates with emulsion wax were made as described above. After drying the peat plates, they were incubated for a period of time in water, and they were tested with respect to water uptake. FIG. 15 shows the water uptake of two different wax emulsions, one anionic wax emulsion (71731), and one cationic wax emulsion (73550), in combination with other additives. PVAC and wax emulsion also gave drier peat pots. The driest plate tested was the one with PVAC, Aquence LA 0276 from Henkel, and the anionic wax emulsion 71731. (FIG. 15.) Even the PVAC alone did not take up much water before 2 days, indicating that the combination formulated (PVAC+71731) is very hydrophobic. There were some slight incompatibilities between this PVAC and the anionic wax emulsion of 71731 (some stickiness & aggregation). For PVAC with the cationic wax emulsion 73550, however, there were no problems. Without wishing to be bound by theory, it is believed that having the "opposite charges" of two different emulsions can result in a problematic manufacturing process.

Figure 16:
FIG. 16: Photograph showing wax emulsion 71731 peat pots manufactured in the factory with added chemicals. Far left: 2% (w sorbate/w peat-pulp) potassium sorbate. Middle: 2% (w/w) PVA (mix of PVAs: Selvol E575 and Selvol 350 with high degree of polymerization). Far right: Triple concentration of 71731 wax emulsion (1.5% (v/v)). To the pots were added Jiffy substrate mix and water, and the bottom parts of the pots were kept constantly under water (1-2 cm from bottom) for 4 weeks.

Factory Manufacturing of Wax Emulsion Pots with Added Polyvinyl Alcohol and Polyvinyl Acetate Wax emulsion pots were made at the Jiffy pot factory using the anionic wax emulsion 71731 and different chemical additives such (1) potassium sorbate, (2) polyvinyl alcohol, and (3) a tripled concentration of wax emulsion 71731 in the slurry. The polyvinyl alcohol was a mix of two different types of qualities from Sekisui: Selvol E575, which contains 86-89% OH-groups (and ~12% acetate groups), and Selvol 350, having 98% OH-groups. However, both have a high molecular weight (HMW)/high degree of polymerization. FIG. 16 shows a photograph comparing the wax emulsion pots with these three types of additives. It is surprising that, as shown in FIG. 16, the combination of PVA with 71731 gives drier pots than by using 3 times amount of wax emulsion 71731. It is possible that the combination of this specific HMW type of PVA provides a much better coating, preventing water uptake and thus lowering mold growth. Previous types of pots made with PVA, in the laboratory, were much more prone to water uptake (compare previous pictures on PVA pots, e.g., FIG. 5).

Figure 17A:
FIGS. 17A-17C: Plant growth (after 6 weeks) in wax emulsion 71731 peat pots manufactured with added chemicals.
Figure 17B:
Figure 17C:

These pots were also tested in a greenhouse under real growth conditions. This tests the pots for further mold growth and the effect of root penetration. FIG. 17A shows that the PVA/wax emulsion pot had less mold growth compared to the pot with potassium sorbate. The PVA emulsion pot was also much drier, even though the growth conditions were wet. However, the root penetration (FIG. 17B) through this PVA pot was not present. Without wishing to be bound by theory, it is possible that HMW PVA prevented this, and may prolong the time for decomposing. Previously, it has been seen that PVA of another type/quality actually promoted root penetration through the wax emulsion pot wall. The emulsion pot with only potassium sorbate had root penetration in this example. Thus, by using PVA of different concentrations and quality, it is possible to manipulate the strength, water uptake, and root penetration of the wax emulsion pot. Even though the roots do not penetrate the PVA/wax emulsion pot wall, the good root development inside the pot (FIG. 17B—right) still indicates that air moves through the pot wall to the roots, in contrast to plastic pots.

Figure 18:
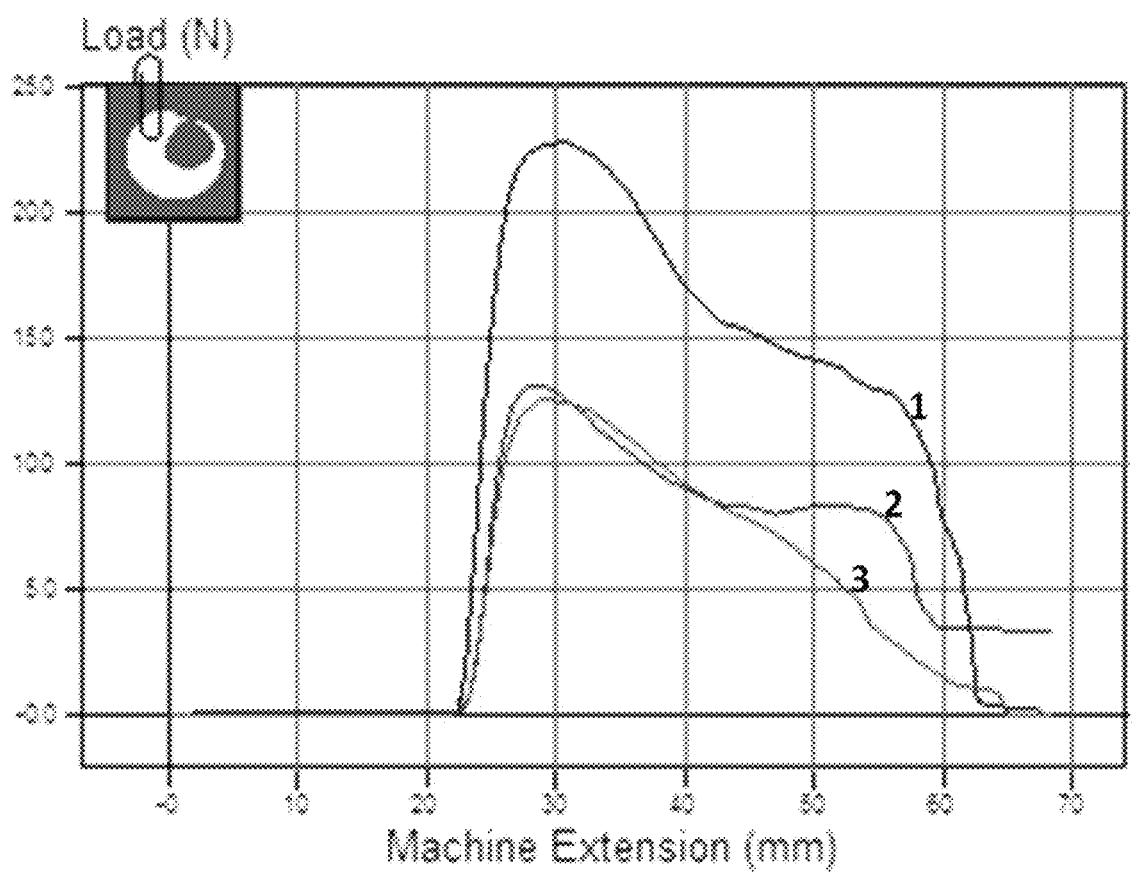
FIG. 18: Load testing/puncture test of 71731 wax emulsion pots with added chemicals (FIG. 16) after 96 hours submerged in water. The black line (labeled 1) represents 71731emulsion pot with 2% (w/w) PVA (22.9N; details in FIG. 16). The red line (labeled 2) represents peat pot with 2% (w/w) potassium sorbate (13.1N). The green line (labeled 3) represents the triple concentration of 71731 wax emulsion (12.5N).

The strength of theses pots was also analyzed. FIG. 18 displays tensile/load testing of these pots, confirming that PVA-emulsion pots were the strongest after being covered with water for 96 hours.

The production process of pots in the factory was replicated, but this time by using different types of PVA and also including PVAC from Intercol. The polyvinyl alcohol was a mix of two premade PVA solutions: VA101 and VA102 (88% OH-groups; 12% acetate groups). They were poled. However, they were possibly low-molecular types of PVA due to their higher solution concentrations of about 15% solids per liter. Solubility of PVA is inversely correlated with MW or degree of polymerization. For example, the high molecular weight PVAs from Sekisui had a low solubility of max 7% solids per liter. The PVAC from Intercol was VA710. However, no further technical background info was given for this emulsion, rather than concentration of 50% solids per liter.

Figure 19:
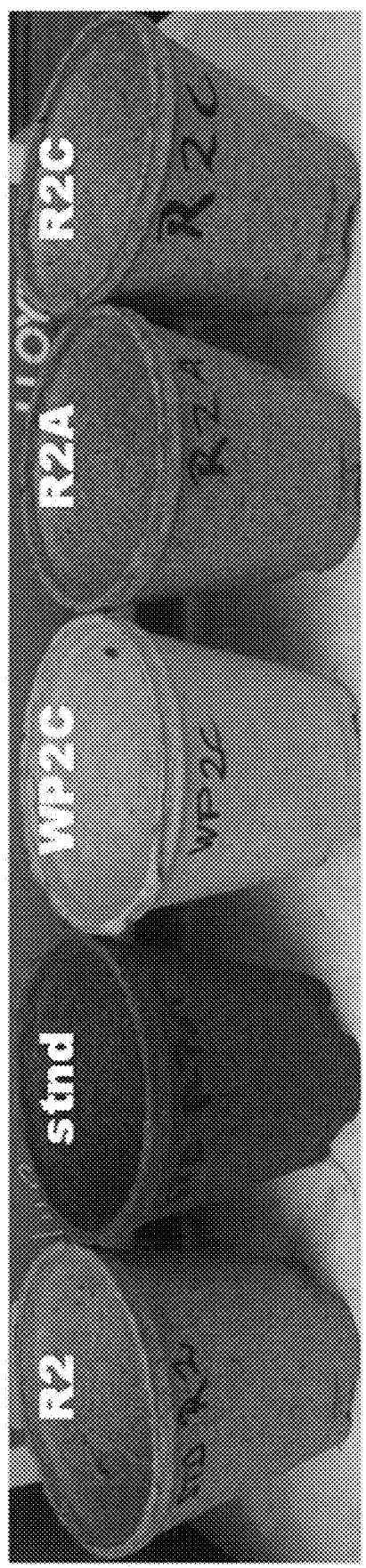
FIG. 19: Photograph of wax emulsion (71731) peat and pulp pots manufactured in the factory with added chemicals. From left: R2=standard 71731 wax emulsion pot; stnd=standard peat pot (no wax emulsion); WP2C=71731 wax emulsion with CTMP only (no peat) and with added 0.5% (w/w) PVAC (VA710; Intercol); R2A=standard 71731 wax emulsion pot with added 1% (w/w) PVA (pooled VA101/VA102; Intercol); R2C=standard 71731 wax emulsion pot with added 0.5% (w/w) PVAC (VA710; Intercol). Pots were totally submerged in water for 1 hour before the picture was taken. Dark color reflects water uptake of the pots.

The PVA pots (R2A) made from the premade PVA solution purchased from Intercol were not as strong as the pots made from the PVA granulate from Sekisui (FIG. 19). The new pot, WP2C, made by only chemi-thermo mechanical pulp (CTMP) and no peat felt very strong, and it had a lighter color. The pots displayed in FIG. 19 had been standing in water for 1 hour previously, so the color at the time of photo reflects water uptake. Darker color indicates more water uptake.

Figure 20A:
FIGS. 20A-20B: Mold occurrence on wax emulsion pots manufactured in the factory with added chemicals.
Figure 20B:

The pots were also filled with substrate mix and left for one week in water with their bottom part (FIG. 20A). Some specs of mold could already be observed on all of these pots, in contrast to previous PVA—wax emulsion pot productions. Although this occurred, the pots still felt strong. In order to make a more mold resistant pot, the pH of the slurry was increased to pH 7 by adding lime for the pots. Even after 4 manufacturing of 71731 wax emulsion weeks in water with these pots, there were no signs of mold, indicating that a higher pH of the slurry before pressing peat pots is beneficial (FIG. 20B). An increase of pH from pH 5 to pH 7, or even higher pH, influences mold growth conditions, since peat mold normally grows at slightly acidic conditions. Some plants may not tolerate too high pH values. Nevertheless, the pH of the substrate inside the pot may not be significantly increased: The pot is encapsulated in wax, protecting this from water uptake during the initial growth period, and the volume of substrate inside the pot is far larger than that of the pot walls.

Figure 21A:
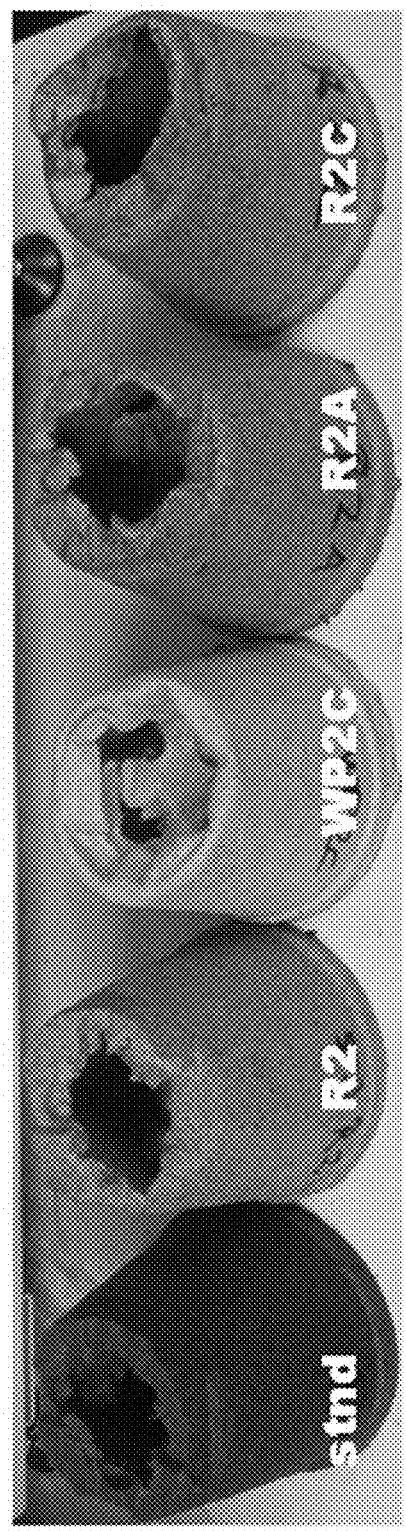
FIGS. 21A-21B: Load testing/puncture test of 71731 wax emulsion pots with added chemicals after 1 hour totally submerged in water.
Figure 21B:
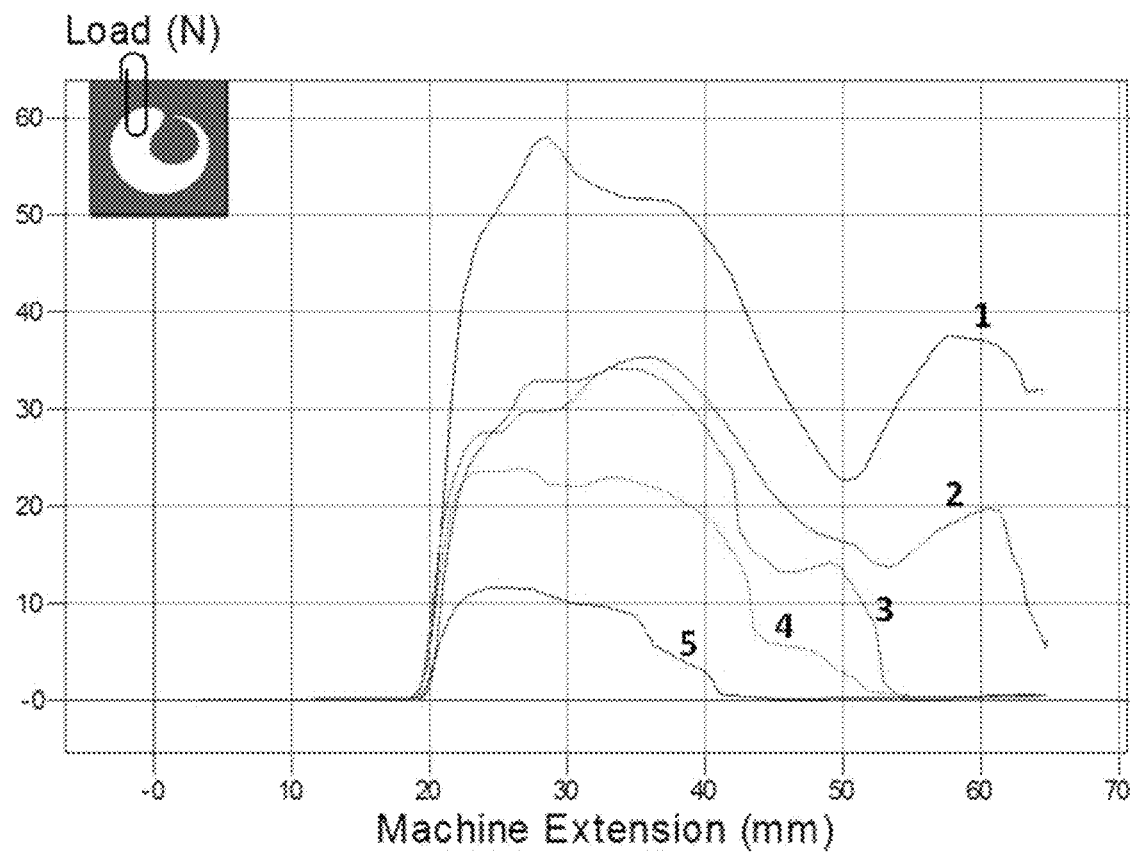

The water uptake and load strength of the pots manufactured with Intercol PVA and PVAC were analyzed over a period of 7 days. FIGS. 21A-21B shows these results, which demonstrate that WP2C, the pulp emulsion wax pot without peat, but with PVAC, is initially the strongest pot (after only 1 hour in water). However, both PVA and PVAC together with wax emulsion, respectively R2A and R2C, manufactured stronger pots than wax emulsion alone (R2).

Figure 22A:
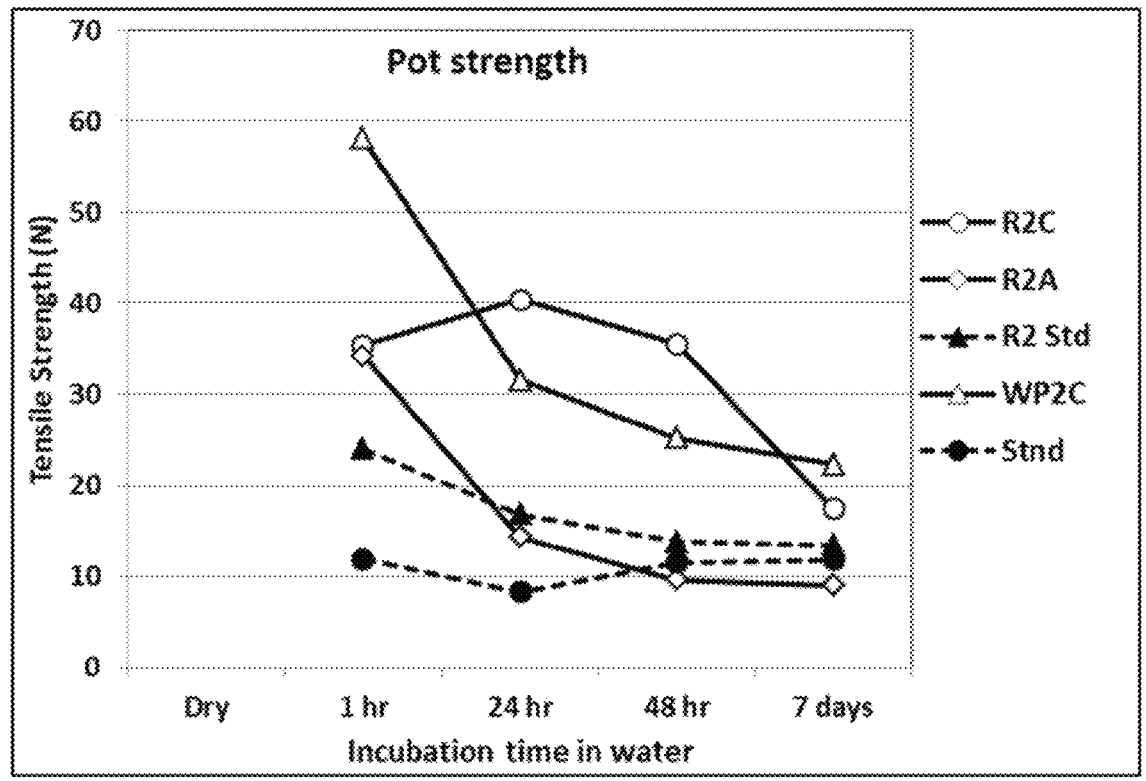
FIGS. 22A-22B: Physical analysis of 71731 wax emulsion pots with added chemicals after totally submerging in water for up to 7 days. Pots were made with Intercol PVA or PVAC.
Figure 22B:
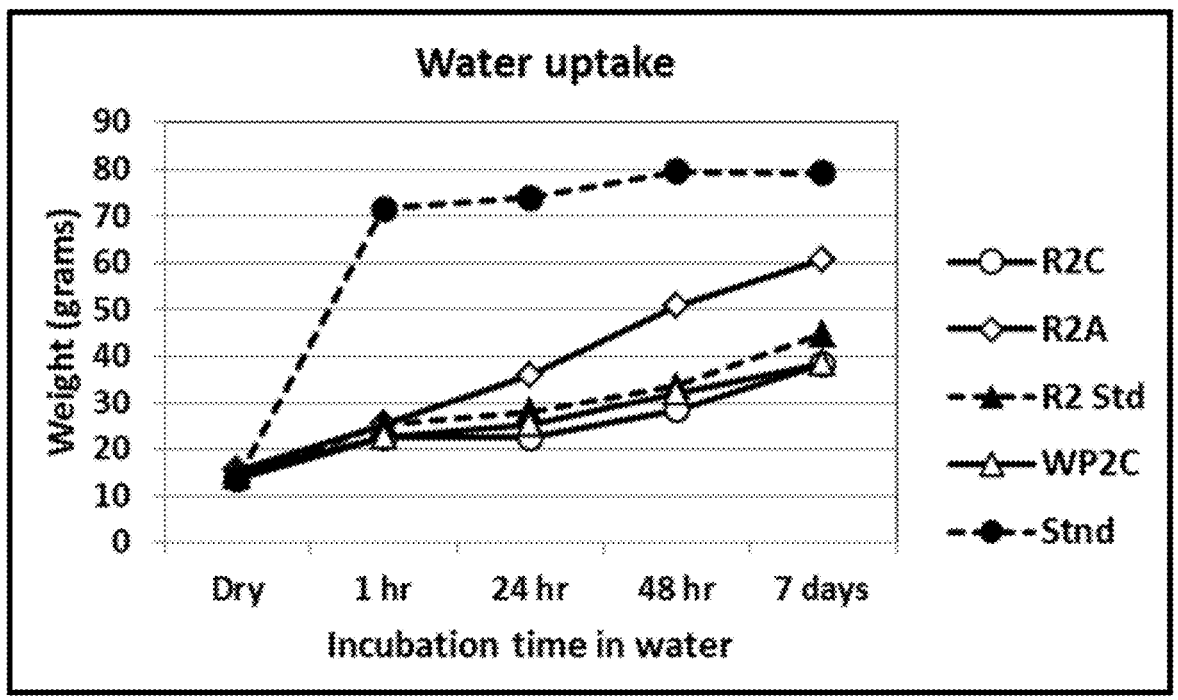

Both the tensile strength and water uptake of the pots were analyzed over 7 days (FIGS. 22A-22B). The pot strength of WP2C was initially lowered fast compared to the R2C pot with peat/CTMP and a similar amount of PVAC. This was also the case for R2A, in contrast to previous observations by using HMW PVA. Nevertheless, the pots made with PVAC were the strongest ones and the ones with the lowest water uptake.

Test of different qualities of PVAC in peat plates

Figure 23:
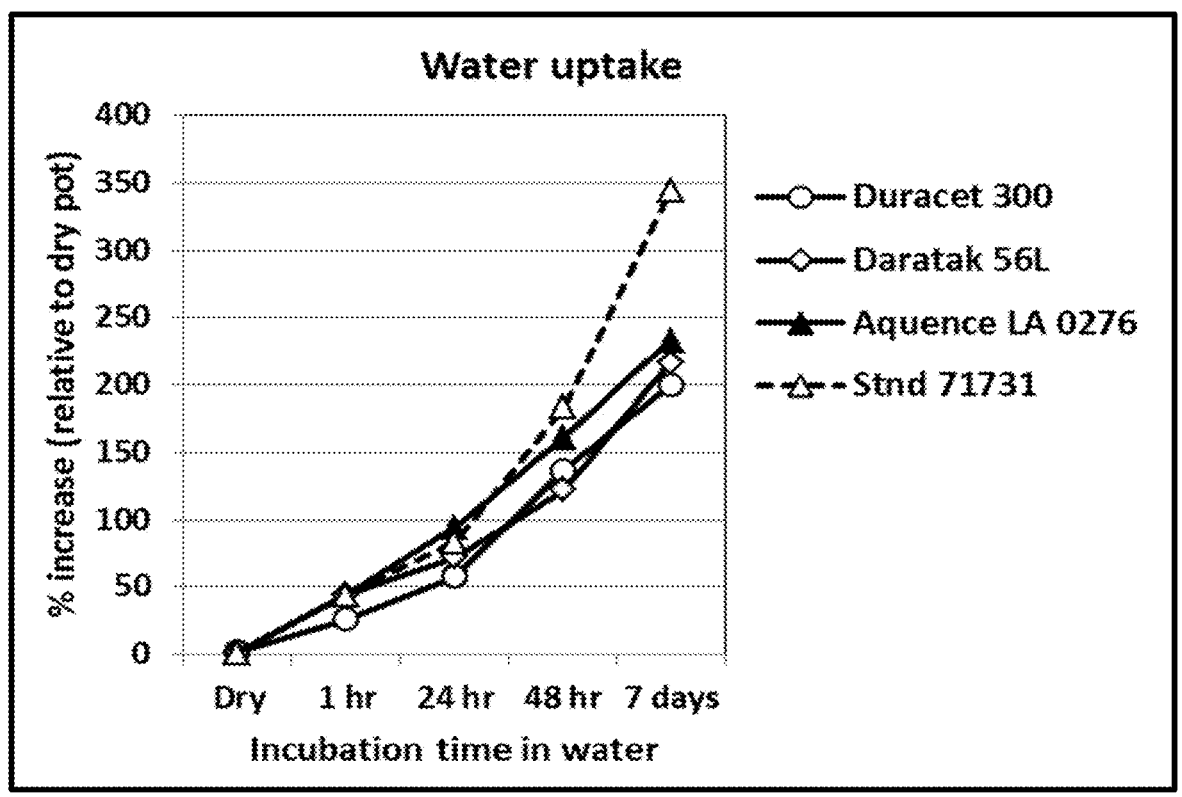
FIG. 23: Water absorption of laboratory made 71731 wax emulsion peat plates with different types of PVAC added, after totally submerging in water for up to 7 days. Peat plates were made with different types of 1% (w PVAC/w peat and pulp) PVAC. Respectively, Duracet 300 (Franklin Adhesives & Polymers), Daratak 56L (Owensboro), and Aquence LA 0276 emulsion (Henkel). Peat plates with PVAC and 71731 were weighed after the noted incubation times in water.

The results in FIGS. 16-22 indicate that it is important to select the correct type of PVA, with proper high molecular weight/high degree of polymerization, in order to get stronger and more water-resistant peat pots. To also test the different qualities of PVAC, three types of PVAC were compared: the Aquence LA 0276 emulsion from Henkel, DARATAK® 56L from Owensboro, and Duracet 300 from Franklin Adhesives & Polymers. FIG. 23 shows the different water uptake of the different peat plates relative to Standard 71731 wax emulsion peat pot. The PVACs take up less water than the standard wax emulsion peat pot, with Daratak 56L and Duracet 300 being the better ones, most likely due to their higher molecular weight contributions.

While the invention has been described with reference to various and preferred embodiments, it should be understood by those skilled in the art that various changes may be made and equivalents may be substituted for elements thereof without departing from the essential scope of the invention.

In addition, many modifications may be made to adapt a particular situation or material to the teachings of the invention without departing from the essential scope thereof. For example the concentrations of additive may be modified to provide a biodegradable plant pot having desired characteristics. Other variables, such as mixing times during production, soaking times, and drying times may also be modified without departing from the essential scope of the invention.

Therefore, it is intended that the invention not be limited to a particular embodiment disclosed herein contemplated for carrying out this invention, but that the invention will include all embodiments falling within the scope of the claims.

What is claimed is:

1. A biodegradable plant pot comprising:
    at least one biodegradable plant pot material comprising peat fiber; and
    a wax emulsion comprising an anionic paraffin wax.
2. The biodegradable plant pot of claim 1, wherein the wax emulsion has a pH of from about 8.0 to about 12.5.
3. The biodegradable plant pot of claim 1, wherein the wax emulsion has a concentration of up to about 20% dry weight wax/dry weight biodegradable plant pot material.
4. The biodegradable plant pot of claim 1, wherein the biodegradable plant material comprises a mixture having a solid material content of from about 10 g/L to about 20 g/L.
5. The biodegradable plant pot of claim 1, wherein the biodegradable plant pot further comprises polyvinyl alcohol (PVA) at a concentration ranging from about 0.05 to about 10% w/w.
6. The biodegradable plant pot of claim 1, further comprising partially hydrolyzed polyvinyl alcohol (PVA), wherein the partially hydrolyzed PVA comprises about 85% OH-groups and about 15% acetate groups.
7. The biodegradable plant pot of claim 1, further comprising lime.
8. The biodegradable plant pot of claim 1, further comprising polyvinyl alcohol (PVA), polyvinyl acetate (PVAC), or a combination thereof.
9. The biodegradable plant pot of claim 1, further comprising coir, wheat straw, paper pulp, Bagasse fibers, wood fiber, flax, kenaf, sisal, digested manure, or chemi-thermo-mechanical pulp.
10. The biodegradable plant pot of claim 1, wherein the biodegradable plant pot further comprises polyvinyl acetate (PVAC).
11. A method for making a biodegradable plant pot comprising:
    a) providing at least one biodegradable plant pot material comprising peat fiber;
    b) providing a wax emulsion comprising an anionic paraffin wax;
    c) mixing the at least one biodegradable plant pot material and the wax emulsion into an aqueous slurry; and
    d) forming a biodegradable plant pot using the aqueous slurry.
12. The method for making a biodegradable plant pot of claim 11, further comprising drying the formed biodegradable plant pot at an elevated temperature ranging from about 200° C. to about 350° C.
13. The method for making a biodegradable plant pot of claim 12, wherein the biodegradable plant pot is formed by pumping or vacuum-depositing the aqueous slurry into a mold or form, and water is removed from the formed biodegradable plant pot by vacuum prior to being dried by the elevated temperature.
14. The method for making a biodegradable plant pot of claim 12, further comprising an after-pressing step comprising transferring the formed or the formed and dried biodegradable plant pot to a new mold and pressing the formed or the formed and dried biodegradable plant pot for a time period ranging from about 0.25 s to about 1 s at a temperature of from about 130° C. to about 190° C.
15. The method for making a biodegradable plant pot of claim 11, wherein the at least one biodegradable plant pot material is mixed with one or more additives into an initial volume of aqueous mixture that is less than a final intended volume of aqueous mixture to be used in the aqueous slurry, thereby allowing the one or more additives to be absorbed by the at least one biodegradable plant pot material prior to bringing the volume of aqueous mixture in the aqueous slurry up to the final intended volume of aqueous mixture.
16. The method for making a biodegradable plant pot of claim 11, wherein the wax emulsion is present in the aqueous slurry at a concentration of from about 2% to about 15% dry weight wax/dry weight biodegradable plant pot material, and the aqueous slurry comprises one or more of polyvinyl alcohol present in the aqueous slurry at a concentration of up to about 10% w/w, or polyvinyl acetate present in the aqueous slurry at a concentration of up to about 10% w/w.
17. A method for improving a biodegradable plant pot comprising:
    a) providing a biodegradable plant pot, wherein the biodegradable plant pot comprises at least one biodegradable plant pot material comprising peat fiber;
    b) providing an aqueous solution comprising a wax emulsion, wherein the wax emulsion comprises an anionic paraffin wax; and
    c) soaking the biodegradable plant pot in the aqueous solution.
18. The method for improving a biodegradable plant pot of claim 17, wherein the method increases one or more of the tensile strength of the biodegradable plant pot, the fungal growth resistance of the biodegradable plant pot, or the hydrophobicity of the biodegradable plant pot.
19. The method for improving a biodegradable plant pot of claim 17, wherein the aqueous solution comprises the wax emulsion at a concentration of from about 0.1% v/v to about 10% v/v, and comprises one or more of polyvinyl alcohol at a concentration of from about 0.01% w/v to about 10% w/v, or polyvinyl acetate at a concentration of from about 0.01% w/v to about 10% w/v.
20. The method for improving a biodegradable plant pot of claim 17, wherein the biodegradable plant pot is soaked in the aqueous solution for a time period ranging from about 30 minutes to about 48 hours.
21. The method for improving a biodegradable plant pot of claim 17, further comprising a drying step wherein the soaked biodegradable plant pot is dried either at room temperature or at an elevated temperature ranging from about 150° C. to about 250° C.

* * * * *